(12) United States Patent
Noguchi et al.

(10) Patent No.: US 7,973,889 B2
(45) Date of Patent: Jul. 5, 2011

(54) LIQUID CRYSTAL DISPLAY HAVING INTERVAL ADJUSTMENT LAYER BETWEEN SUBSTRATES AND METHOD OF PRODUCING THE SAME

(75) Inventors: Koji Noguchi, Kanagawa (JP); Masaaki Kabe, Kanagawa (JP); Hidemasa Yamaguchi, Kanagawa (JP); Kazuyuki Endo, Kanagawa (JP); Shuichi Tatemori, Kanagawa (JP); Eiji Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/936,970

(22) Filed: Sep. 9, 2004

(65) Prior Publication Data

US 2005/0117097 A1 Jun. 2, 2005

(30) Foreign Application Priority Data

Sep. 16, 2003 (JP) ................ P2003-323058
Feb. 10, 2004 (JP) ................ P2004-033697

(51) Int. Cl.
*G02F 1/1335* (2006.01)
(52) U.S. Cl. ........................ 349/114; 349/106
(58) Field of Classification Search ................ 349/114, 349/106
See application file for complete search history.

(56) References Cited

U.S. PATENT DOCUMENTS

| 4,632,514 | A * | 12/1986 | Ogawa et al. | 349/160 |
|---|---|---|---|---|
| 6,757,038 | B2 * | 6/2004 | Itoh et al. | 349/113 |
| 6,788,367 | B2 * | 9/2004 | Chang et al. | 349/114 |
| 6,842,207 | B2 * | 1/2005 | Nishida et al. | 349/107 |
| 6,864,945 | B2 * | 3/2005 | Fujimori et al. | 349/156 |
| 6,927,818 | B2 * | 8/2005 | Hinata et al. | 349/114 |
| 2003/0063244 | A1 * | 4/2003 | Fujimori et al. | 349/113 |
| 2003/0231267 | A1 * | 12/2003 | Murai et al. | 349/113 |

FOREIGN PATENT DOCUMENTS

| JP | 11-295707 | 10/1999 |
|---|---|---|
| JP | 2002-236371 | 8/2002 |
| JP | 2003-156756 | 5/2003 |
| JP | 2003-255331 | 9/2003 |
| JP | 2003-344839 | 12/2003 |

OTHER PUBLICATIONS

Japanese Office Action issued on May 22, 2007.

* cited by examiner

*Primary Examiner* — Nathanael R Briggs
(74) *Attorney, Agent, or Firm* — SNR Denton US LLP

(57) ABSTRACT

In a normally black mode liquid crystal display, the liquid crystal display and the method prevents the light leakage arising from existing the step for adjusting the thickness of the liquid crystal layer between the reflective electrode and the transparent electrode and that high contrast displaying can be possible. The interval adjustment layer is formed between the first substrate that the reflective electrode is formed in the reflective region and the transparent electrode is formed in the transmissive region, and the second substrate that is fixed at predetermined interval from the first substrate. This interval adjustment layer is adjuster of the thickness of the liquid crystal layer in the reflective region on the second substrate, and the thickness of the liquid crystal layer in the reflective region is preferable to be set approximately the thickness of the liquid crystal layer of the transmissive region.

12 Claims, 26 Drawing Sheets

TRANSMISSION AXIS

RETARDATION AXIS

RUBBING DIRECTION OF
LIQUID CRYSTAL CELL

TRANSMISSION AXIS

LIQUID CRYSTAL CELL 1

| GREEN GAP | x | y | Y |
|---|---|---|---|
| 5.0 | 0.1855 | 0.2585 | 0.077 |
| 4.8 | 0.1679 | 0.2162 | 0.042 |
| 4.6 | 0.1513 | 0.1594 | 0.018 |
| 4.4 | 0.1669 | 0.1216 | 0.008 |
| 4.2 | 0.2863 | 0.2526 | 0.012 |
| 4.0 | 0.3770 | 0.4440 | 0.032 |

| RED GAP | x | y | Y |
|---|---|---|---|
| 5.0 | 0.2470 | 0.1499 | 0.012 |
| 4.8 | 0.2027 | 0.1053 | 0.005 |
| 4.6 | 0.2367 | 0.0976 | 0.003 |
| 4.4 | 0.4251 | 0.2036 | 0.007 |
| 4.2 | 0.5681 | 0.3074 | 0.016 |
| 4.0 | 0.6016 | 0.3457 | 0.031 |

TOP VIEW

SIDE VIEW

TRANSMISSION AXIS
15°
∠∼2
POLARIZER

RETARDATION AXIS
30°
∠∼4
RETARDATION FILM
POLY CARBONATE 260nm

CF (COLOR FILTER) SIDE — 90° — TFT (THIN FILM TRANSISTOR) SIDE
∠∼1
LIQUID CRYSTAL
HOMOGENIOUS ALIGNMENT
(ANTI-PARALLEL ALIGNMENT)

TRANSMISSION AXIS
45°
∠∼3
POLARIZER

RETARDATION FILM
POLY CARBONATE 260nm

LIQUID CRYSTAL
TWIST ALIGNMENT
(EXAMPLE 45°)

US 7,973,889 B2

LIQUID CRYSTAL DISPLAY HAVING INTERVAL ADJUSTMENT LAYER BETWEEN SUBSTRATES AND METHOD OF PRODUCING THE SAME

RELATED APPLICATION DATA

The present application claims priority to Japanese Application(s) No(s). P2003-323058 filed Sep. 16, 2003, and P2004-033697 filed Feb. 10, 2004, which application(s) is/are incorporated herein by reference to the extent permitted by law.

BACKGROUND OF THE INVENTION

1. Field of the Invention

The present invention relates to a liquid crystal display and a method of producing the same, in particular, to a liquid crystal display in which a reflective type display and a transmissive type display are used together, and a normally black mode is adopted, and a method of producing the same.

2. Description of the Related Art

A liquid crystal display has an advantage of thin shape, lightweight, low power consumption in comparison with a CRT (Cathode Ray Tube) display, therefore it is used as display devices for various electronic devices, such as a personal computer, a cellular phone, a digital camera.

The liquid crystal display is classified roughly to a transmissive type and a reflective type. The liquid crystal display is, different from the CRT display, not a self-luminous display. Consequently, the transmissive type liquid crystal display has a flat surface light source as the light source in the reverse surface, called as a backlight. Displaying is performed by the light from a backlight transmitted a liquid crystal panel. The transmissive type liquid crystal display has advantages of being unaffected in the case that surrounding light is weak and being possible to displaying in high luminance and high contrast, since displaying is performed by using a backlight.

However, since the backlight accounts for more than 50 percent of all electric power consumption of the liquid crystal display, the transmissive type liquid crystal display has a problem that it is difficult to decrease the electric power consumption. Moreover, in the case that surrounding light is strong, there is some problems that displaying looks darkly, and visibility gets worse.

On the other hand, the reflective type liquid crystal display, surrounding light is used as a light source, the surrounding light source is reflected by a light reflector, the display is performed when the reflected light is transmitted a liquid crystal panel. Since, it is necessary to convert the surrounding light that is a point light source into a surface illuminant on the display surface, the light reflector has an uneven surface for diffuse-reflection. The reflective liquid crystal display like this has an advantage of low electric power consumption, because the reflective type liquid crystal display that is different from the transmissive type liquid crystal display does not use a backlight. However, when the surround is dark, since a reflected light is small, luminance and contrast is not enough and visibility gets worse. In particular, in the case of color display, usability of the reflected light goes down by the color filter and visibility gets especially worse.

To overcome the disadvantage, in the transmissive and the reflective type liquid crystal display, for example, Japanese unexamined patent publication No. 2001-318377 discloses that the semi-transparent or the combination type liquid crystal display, that the transmissive type display and the reflective type display is used together. The combination type liquid crystal display displays by applying reflection of the surrounding light when the surround is light, by applying a backlight when the surround is dark.

FIG. 10 is a plan view of one pixel of the existing combination type liquid crystal display. FIG. 11 is a perspective view of one pixel of the existing combination type liquid crystal display.

As shown in FIG. 10, the combination type liquid crystal display has in one pixel the both of the reflective region Ar10 that the reflective electrode is formed, and the transmissive region Ar20 that the transparent electrode is formed. As shown in FIG. 11, the liquid crystal layer 130 is wedged between the first substrate 110 and the second substrate 120. On the first substrate 110 side, an unevenness reflective electrode is formed in the reflective region Ar10, and a transparent electrode is formed in the transmissive region Ar20.

The first substrate 110 is a so-called TFT (Thin Film Transistor) substrate, a switching element that is formed with TFT etc., an auxiliary capacitance line, a gate line and a signal line are formed. As well, in FIG. 11, for simplification of a figure, a signal line 112 is only shown.

In the case of the combination type liquid crystal display, in the reflective region Ar10, since the light passing through the liquid crystal layer 130 is reflected by the reflective electrode, and passes through the liquid crystal layer 130 again, the light passes through the liquid crystal layer 130 twice in all. However, in the transmissive region Ar20, the transmitted light passes through the liquid crystal layer 130 only once. Therefore, it is necessary that the thickness of the liquid crystal layer 130 in the transmissive layer Ar20 is designed to be the twice thickness of the liquid crystal layer 130 in the reflective region Ar10.

On the other hand, there is many normally white mode liquid crystal display that transmittance of the transmissive region becomes the maximum in voltage non-applied condition as the combination type liquid crystal display. This is, generally, why by adopting normally black mode, that the transmittance of the transmissive region becomes the minimum in voltage non-applied condition, the good "black" display is difficult in voltage non-applied condition.

However, in the combination type liquid crystal display of normally white mode, it is necessary to establish on one side of a liquid crystal panel, on the other side of the panel two optical retardation films and one polarizer. In fact, it is necessary to locate six sheets in all on both sides. On the other hand, in normally black mode, on one side of a liquid crystal panel one optical retardation film and one polarizer on the other side of the panel, one polarizer or one polarizer and one optical retardation film should be located, there is an advantage that the number of parts decreases.

However, in normally black mode, since the cell gap between the reflective region Ar10 and the transmissive region Ar20 is adjusted by a layer 111 formed below a reflective electrode of the first substrate 110, there is a step C on the boundary of the reflective region Ar10 and the transmissive region Ar20 on the first substrate 110.

By existing the step C for adjusting the thickness of the liquid crystal layer 130 on the boundary of the reflective region Ar10 and the transmissive region Ar20 on the first substrate 110, the alignment of the retardation of this part is inadequate, and as shown in FIG. 12, there is a problem that the light leakage region Ar30 is generated. Thereby, at the transmissive region Ar20 that high contrast is needed especially, there is a problem that enough contrast is unavailable.

SUMMARY OF THE INVENTION

An object of the present invention is to provide a liquid crystal display that light leakage that is caused by existing a step for adjusting the thickness of a liquid crystal layer, between a reflective electrode and a transparent electrode at a normally black mode liquid crystal display can be prevented, and that is possible to indicate high contrast display, and producing the method of manufacturing the above-mentioned liquid crystal display. According to a first aspect of the present invention, there is provided a liquid crystal display having a reflective region and a transmissive region, and the transmittance of the transmissive region being the minimum in the condition that voltage applied to the liquid crystal layer is low, the transmittance of the transmissive region being the maximum in the condition of high-voltage applied, said liquid crystal display comprising:

a first substrate formed with a reflective electrode in said reflective region and a transparent electrode in said transmissive region a second substrate fixed at predetermined interval from said first substrate said liquid crystal layer being charged between said first substrate and said second substrate; and an interval adjustment layer formed for adjusting the thickness of said liquid crystal layer in said reflective region of said second substrate by narrowing said interval.

According to a second aspect of the present invention, there is provided a liquid crystal display wherein the thickness of said interval adjustment layer is set approximately half of said thickness of said liquid crystal layer in said transmissive region for obtaining high contrast display.

According to a third aspect of the present invention, there is provided a liquid crystal display wherein said interval adjustment layer is formed to be located inside said reflective region in a distance being set in consideration of manufacturing error at least on the boundary between said reflective region and said transmissive region.

According to a fourth aspect of the present invention, there is provided a liquid crystal display wherein a columnar spacer is formed in said reflective region and the interval between said first substrate and said second substrate is determined by the thickness of said spacer and said interval adjustment layer.

According to a fifth aspect of the present invention, there is provided a liquid crystal layer wherein a plurality of color filters transmitting the light of the specific wavelength is formed at each wavelength on said second substrate, and said interval adjustment layer is formed by being adjusted the thickness of said color filter placed in said reflective region.

According to a sixth aspect of the present invention, there is provided a liquid crystal layer wherein a plurality of color filters transmitting the light of the specified wavelength is formed at each wavelength on said second substrate and said interval adjustment layer has the different thickness at least between two said color filters according to the light of said wavelength that said color filter transmits.

According to a seventh aspect of the present invention, there is provided a liquid crystal layer wherein said liquid crystal layer has Homogenious alignment that a long axis of a liquid crystal molecule turns to the same direction between said first substrate and said second substrate.

In the liquid crystal display of this invention, in the reflective region of the second substrate, an interval adjustment layer that adjust the liquid crystal layer in the reflective region by narrowing interval of the substrates is formed. It is preferable that the thickness of the interval adjustment layer is set so that the thickness of the liquid crystal layer in the reflective region is approximately half of the thickness of the liquid crystal layer in the transmissive layer.

Since there is no step to adjust the gap, between the transparent electrode and the reflective electrode in the first substrate, on the boundary of this electrode, retardation of the liquid crystal layer is inadequate.

According to an eighth aspect of the present invention, there is provided a method of producing a liquid crystal display having a reflective region and a transmissive region, and the transmittance of the transmissive region being the minimum in the condition that voltage applied to the liquid crystal layer is low, the transmittance of the transmissive region being the maximum in the condition of high-voltage applied, said method comprising a step of forming a reflective electrode in said reflective region on said first substrate and forming a transparent electrode in said transmissive region on said first substrate, a step of forming an interval adjustment layer adjusting the thickness of said liquid crystal layer in said reflective region on said second substrate, a step of fixing said first substrate and said second substrate at predetermined interval, a step of forming said liquid crystal layer being charged between said first substrate and said second substrate reflective region on said second substrate, a step of fixing said first substrate and said second substrate at predetermined interval and a step of forming said liquid crystal layer charged between said first substrate and said second substrate.

According to a ninth aspect of the present invention, there is provided a method of producing a liquid crystal display wherein said step of forming a reflective electrode in said reflective region on said first substrate and forming a transparent electrode in said transmissive region on the first substrate comprises a step of forming a transparent light-sensitive film planarizing the surface of said substrate on said first substrate, a step processing said light-sensitive film by exposing the surface of said light-sensitive film in said reflective region so that said reflective electrode has the surface condition to diffuse-reflect incident light, a step of forming said reflective electrode coating said light-sensitive film in said reflective region and a step of forming said transparent electrode in said transmissive region on said first substrate.

According to a tenth aspect of the present invention, there is provided a method of producing a method of producing a liquid crystal display wherein the thickness of said interval adjustment layer is set approximately half of said thickness of said liquid crystal layer in said transmissive region for obtaining high contrast display.

According to an eleventh aspect of the present invention, there is provided a method of producing a method of producing a liquid crystal display wherein in said step of forming said interval adjusting layer, said interval adjustment layer is formed so that said interval adjustment layer is located inside said reflective region in a distance being set in consideration of manufacturing error at least on the boundary between said reflective region and said transmissive region.

According to a twelfth aspect of the present invention, there is provided a method of producing a method of producing a liquid crystal display wherein the columnar spacer is formed in said reflective region and an interval between said first substrate and said second substrate is determined by the thickness of said spacer and said interval adjustment layer.

In the above-mentioned method of producing the liquid crystal display of this invention, in the reflective region on the second substrate, the interval adjustment layer to adjust the thickness of the liquid crystal layer in the reflective region by narrowing interval of the substrates is formed. It is preferable that the thickness of the interval adjustment layer is set so that the thickness of the liquid crystal in the reflective layer is approximately half of the thickness of the liquid crystal layer in the transmissive region.

Since in the liquid crystal display that is produced to fix the second substrate that the interval adjustment layer is formed as mentioned above and the first substrate, there is no step to adjust the interval, between the transparent electrode and the reflective electrode in the first substrate, on the boundary of this electrode, a retardation of the liquid crystal layer is inadequate.

According to a thirteenth aspect of the present invention, there is a method of producing a liquid crystal display having a reflective region and a transmissive region, and the transmittance of the transmissive region being the minimum in the condition that voltage applied to the liquid crystal layer is low, the transmittance of the transmissive region being the maximum in the condition of high-voltage applied, said method comprising a step of forming a reflective electrode in said reflective region on said first substrate and forming a transparent electrode in said transmissive region on said second substrate, a step of forming a plurality of color filters transmitting a light at specific wavelength on said second substrate and forming an interval adjustment layer adjusting the thickness of said liquid crystal layer in said reflective region on said second substrate, a step of fixing said first substrate and said second substrate at predetermined interval and a step of forming said liquid crystal layer being charged between said first substrate and said second substrate.

According to a fourteenth aspect of the present invention, there is a method of producing a liquid crystal display wherein said step of forming said reflective electrode in said reflective region on said first substrate and forming said transparent electrode in said transmissive region on said first substrate comprises a step of forming a transparent light-sensitive film planarizing the surface of said substrate on said first substrate, a step of processing said light-sensitive film by exposing the surface of said light-sensitive film in said reflective region so that said reflective electrode has the surface condition to diffuse-reflect incident light, a step of forming said reflective electrode coating said light-sensitive film in said reflective region and a step of forming said transparent electrode in said transmissive region on said first substrate.

According to a fifteenth aspect of the present invention, there is a method of producing a liquid crystal display further comprising a step of processing said light-sensitive film so that the thickness of said liquid crystal layer differs for said wavelength that the color filter transmits as at least two kind of above color filter in the transmissive region by exposing the surface of said light-sensitive film in said transmissive region at the same time.

According to a sixteenth aspect of the present invention, there is a method of producing a liquid crystal display further comprising a step of forming a liquid crystal layer having Homogenious alignment that a long axis of a liquid crystal molecule turns to the same direction between said first substrate and said second substrate.

According to a seventeenth aspect of the present invention, there is a method of producing a liquid crystal display further comprising a step of a color filter in which a light of the same wavelength is transmitted is formed with different materials separately in said reflective region and said transmissive region.

According to an eighteenth aspect of the present invention, there is a method of producing a liquid crystal display wherein the formation of said interval adjustment layer is performed by adjusting the thickness of said color filter in said reflective region at the time forming said color filter.

According to a nineteenth aspect of the present invention, there is a method of producing a liquid crystal display further comprising a step of forming said color filters by changing the thickness of at least two kind of said color filters in said transmissive region so that the thickness of said liquid crystal layer for said wavelength in which said color filter is transmitted.

According to a twentieth aspect of the present invention, there is a method of producing a liquid crystal display further comprising a step of forming a liquid crystal layer having a Homogenious alignment that a long axis of the liquid crystal molecule turns to the same direction between said first substrate and said second substrate.

According to the above-mentioned method of producing the liquid crystal display of this invention, at producing the color liquid crystal display, the interval adjustment layer to adjust the thickness of the liquid crystal layer in the reflective region by narrowing interval of the substrates is formed. The thickness of the interval adjustment layer is preferable to be set so that the thickness of the liquid crystal layer in the reflective region is approximately half of the thickness of the liquid crystal layer in the transmissive layer.

As mentioned above, since in the liquid crystal display that is produced to fix the second substrate that the interval adjustment layer is formed as mentioned above and the first substrate, there is no step to adjust the interval between the transparent electrode and the reflective electrode in the first substrate, retardation of the liquid crystal layer is inadequate on the boundary of this electrode.

According to this invention, the light leakage arising from the step to adjust the thickness of the liquid crystal layer existing between the reflective electrode and the transparent electrode can be prevented, and a normally black mode liquid crystal display being possible to display high contrast displaying can be achieved.

BRIEF DESCRIPTION OF THE DRAWINGS

These and other objects and features of the present invention will become clearer from the following description of the preferred embodiments given with reference to the accompanying drawings, wherein.

DESCRIPTION OF THE PREFERRED EMBODIMENT

Preferred embodiments of the present invention and the method of producing it will be described with reference accompanying drawings.

The First Embodiment

Figure 1:
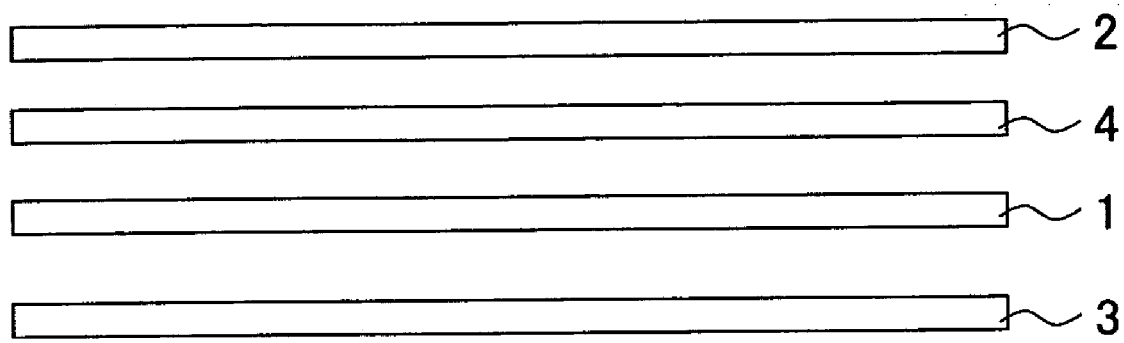
FIG. 1 is a rough block view of the combination type color liquid crystal display in connection with the first to fourth embodiments.
Figure 2:
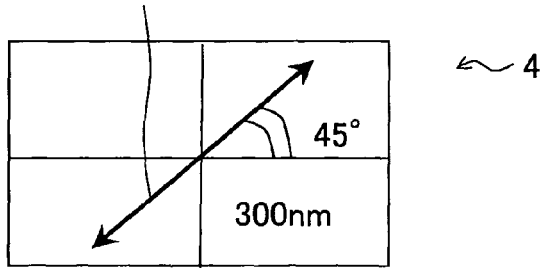
FIG. 2 is a figure showing a construction of the polarizer and the retardation film in FIG. 1.
Figure 2:
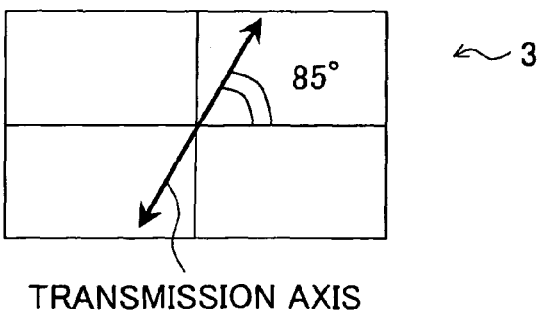
Figure 2:
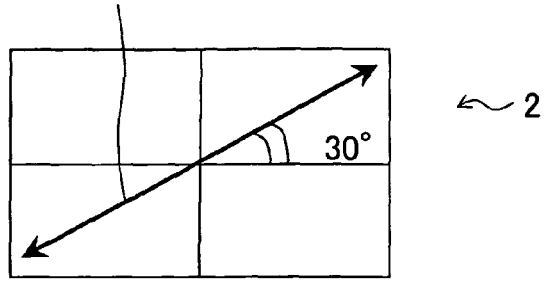
Figure 2:
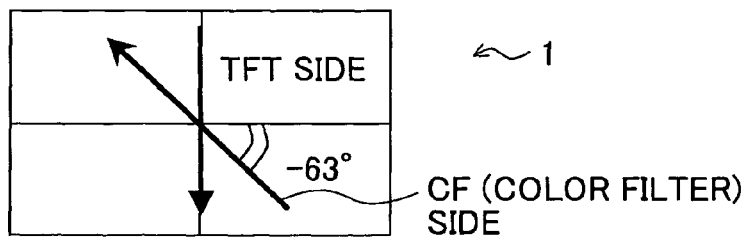

FIG. 1 is a rough block view of the combination type color liquid crystal display in connection with the present embodiment. FIG. 2 is a figure showing a construction of the polarizer and the retardation film shown in FIG. 1.

The liquid crystal display in connection with the present embodiment two polarizers 2, 3 is set on both sides of the liquid crystal cell 1, retardation film 4 is set between the polarizer 2 and the liquid crystal cell 1, and each material 2 to 4 is stuck on the liquid crystal cell 1. As well, the other retardation film may be set between the liquid crystal cell 1 and the polarizer 3. The side of polarizer 2 of the liquid crystal cell 1 is the upper side of the liquid crystal display, and the side of polarizer 3 is the side that light from a backlight enters, that is to say, the lower side.

The retardation film 4 is formed with, for example, polycarbonate or Arton (made by JSR CORPORATION), acts as a half-wave plate. In the case of adjusting the thickness of the liquid crystal layer to make the liquid crystal cell 1 workable as a quarter-wave plate, a circular polarizer is constructed in the range of pai/4 to pai/2 by the retardation film 4 and the liquid crystal cell 1.

As shown in FIG. 2, the retardation axis of the retardation film 4 is set to be rotated clockwise 72 degrees for the rubbing direction of the upper side near the color filter substrate of the liquid crystal cell 1 and further the transmission axis of the polarizer 2 is set to be rotated clockwise 15 degrees for the retardation axis of the retardation film 4. Moreover, transmission axis of the polarizer 3 is set to be rotated anticlockwise 5 degrees for the rubbing direction of the lower side near the TFT substrate of the liquid crystal cell 1.

With said construction, a normally black mode liquid crystal display that the transmittance of the transmissive region becomes the minimum in the condition of low-voltage applied or at the time of power-off, the transmittance of the transmissive region becomes the maximum in the condition of high-voltage applied or at the time of power-on is obtained. In addition, the retardation axis of the retardation film 4, the transmission axis of the polarizer 2, 3 and the angle of the rubbing direction of the liquid crystal cell 1 is possible to change the configuration for the liquid crystal material and the thickness of the cell, without limiting the present embodiment.

Figure 3:
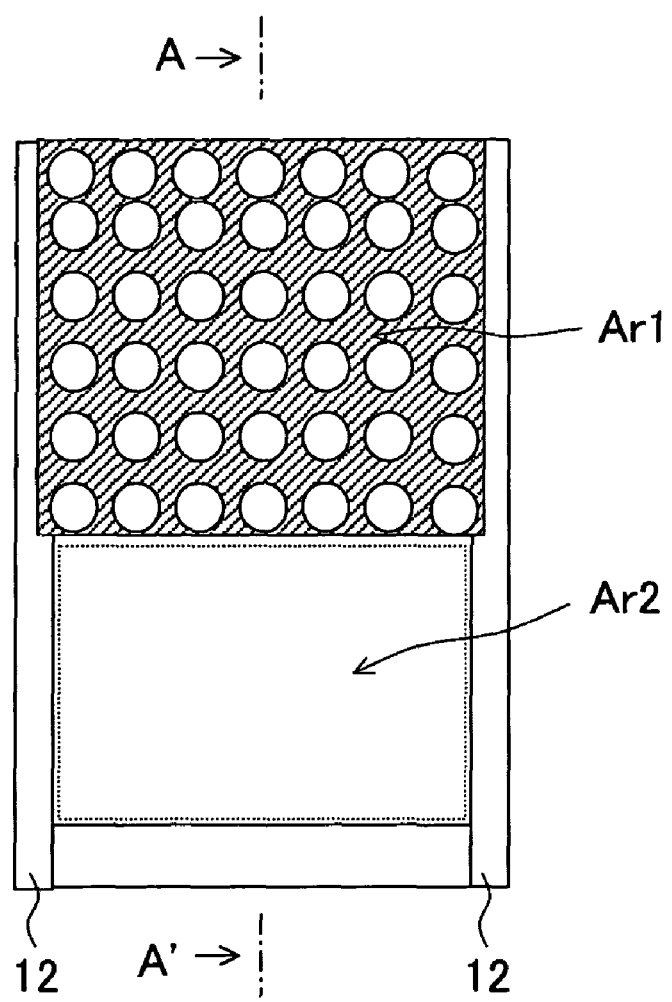
FIG. 3 is a plan view of one pixel of the liquid crystal cell.

FIG. 3 is a plan view of one pixel of the liquid crystal cell.

As shown in FIG. 3, the combination type liquid crystal display consists of the reflective region Ar1 to perform the reflective type display with having the reflective electrode in the pixel, and the transmissive region Ar2 to perform the transmissive type display with having the transparent electrode.

In the reflective region Ar1, the reflective type display is performed by reflecting the incident light and controlling a quantity of the reflected light, in the transmissive region Ar2, the transmissive type display is performed with controlling a quantity of the transmitted light from the backlight on the lower side. As well, the signal line 12 is wired as enclosing each pixel.

Figure 4:
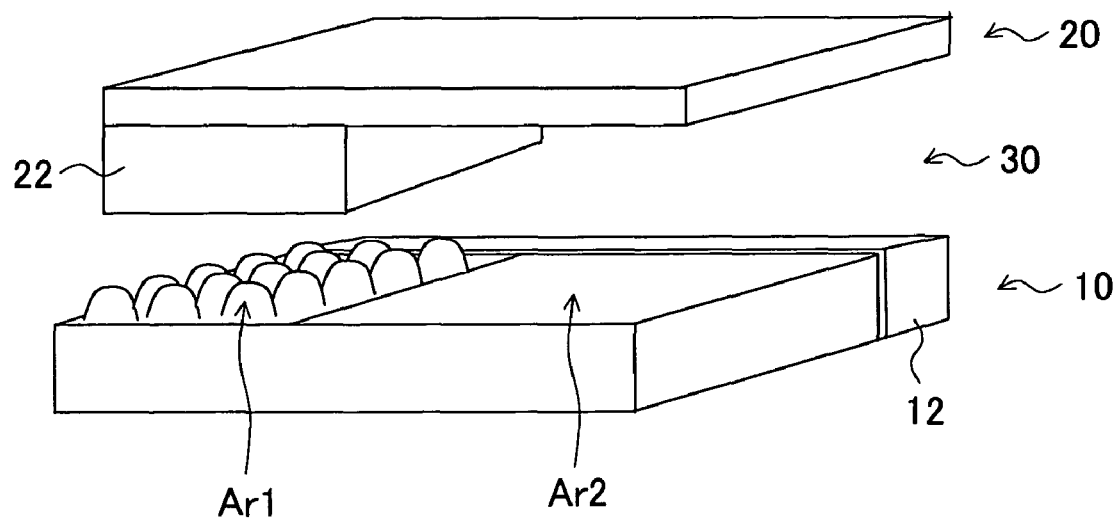
FIG. 4 is a perspective view of one pixel to explain the construction of the liquid crystal cell.
Figure 5:
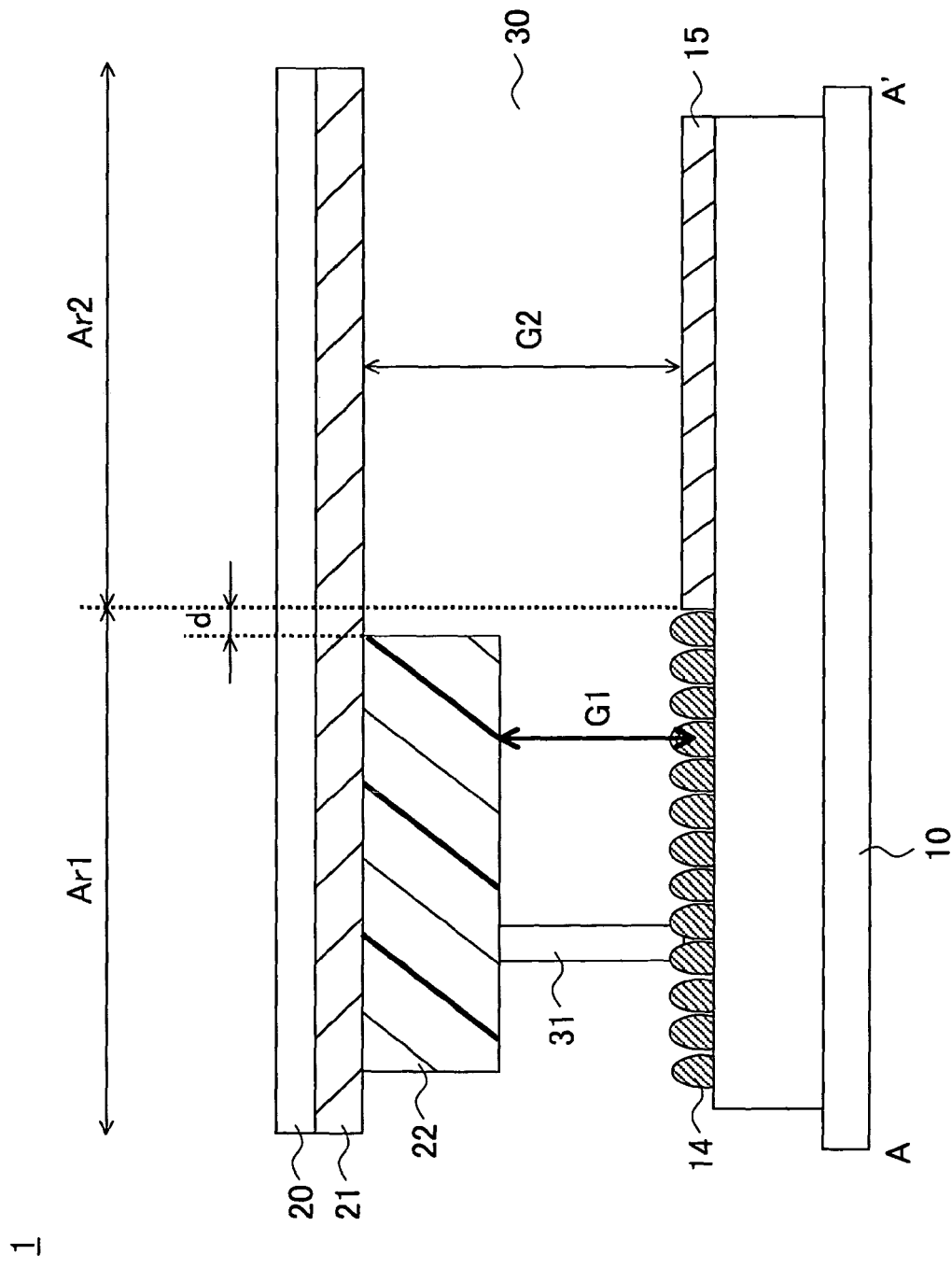
FIG. 5 is a cross-sectional view at A-A' line in FIG. 3.

FIG. 4 is a perspective view of one pixel to explain the construction of the liquid crystal cell. FIG. 5 is a cross-sectional view at A-A' line in FIG. 3.

As shown in FIG. 4 the liquid crystal layer 30 is inserted and held between the first substrate 10 and the second substrate 20, and the liquid crystal cell 1 is constructed. Outside the first substrate 10, the polarizer 3 shown in FIG. 1 is placed, outside the second substrate 20, the retardation film 4 shown in FIG. 1 is placed.

The first substrate 10 is a so-called TFT (Thin Film Transistor) substrate. A switching element, an auxiliary capacitance line, a gate line and a signal line are formed. As well, for simplification of a figure, in FIG. 3, 4, only a signal line is shown.

As shown in FIG. 5, at the first substrate 10, the reflective electrode 14 that consists of silver etc. having an uneven structure is formed, the transparent electrode 15 that consist of the ITO (Indium Tin Oxide) etc. is formed in the transmissive region Ar2. The transparent electrode 15 has a construction diffuse-reflecting the outside light by forming unevenness on the surface of the reflective electrode 14. Thereby, it is possible to observe the screen in the large range of the angle with expanding the orientation angle of the reflective light.

On the first substrate 10 in all regions including the reflective region Ar1 and the transmissive region Ar2, without indicating in a figure, an alignment film that consists of polyimide etc. controlling the alignment direction of the liquid crystal layer 30 is formed. Moreover, the surface of said alignment film is performed the rubbing process.

The second substrate 20 is a so-called color filter substrate, the color filter 21 that consists of a red filter, a green filter or a blue filter is formed. That is to say, the color filter 21 of a red filter, a green filter or a blue filter is placed in one pixel having the reflective region Ar1 and the transmissive region Ar2 and three pixels form one display unit. The color filter 21 is a resin layer colored to each color by stain or pigment. As a red filter, mostly the light of red wavelength range is only transmitted, as a green filter, mostly the light of green wavelength range is only transmitted, and as a blue filter, mostly the light of blue wavelength range is only transmitted.

In the reflective region Ar1 on the second substrate 20, the interval adjustment layer 22 adjusting the cell gap is formed so that the cell gap G1 in the reflective region Ar1 is approximately half of the cell gap G2 in the transmissive region Ar2. For example, the interval adjustment layer 22 is formed with transparent resist resin. The cell gap G1, G2 in the reflective region Ar1 and the transmissive region Ar2 is equivalent to the thickness of the liquid crystal layer 30 held between the substrate 10 and 20. For example in the case that the cell gap G2 in the transmissive region Ar2 is 4.4 μm, the cell gap G1 in the reflective region Ar1 is adjusted to be approximately half of the cell gap G2, for example approximately 2.4 μm.

The interval adjustment layer 22 is, at least on the boundary between the reflective region Ar1 and the transmissive region Ar2, formed to be located inside the reflective region Ar1 in a distance d being set in consideration of manufacturing error and so on. Because if the end of the interval adjustment layer 22 exists on the boundary between the reflective region Ar1 and the transmissive region Ar2, on the boundary the retardation is inadequate and causes of the light leakage. The distance d is set in considering of a manufacturing error, for example if the manufacturing error is within ±5 μm, the distance d is set to 5 μm. The end of the interval adjustment layer 22 is located within the reflective region Ar1, but there is no problem since the absolute value of the contrast of the reflective type display in the reflective region Ar1 is not larger than the absolute value of the transmissive type display of the transmissive region Ar2 and a little light leakage in the reflective region Ar1 has little influence on the contrast.

Without indicating in a figure, on the second substrate 20 a transparent counter electrode consisting of ITO etc. is formed in all surfaces including the reflective region Ar1 and the transmissive region Ar2. On the counter electrode, without indicating in a figure, the alignment film consisting of polyimide etc. controlling the alignment direction of the liquid crystal layer 30 is formed and the surface of the alignment film is performed the rubbing process.

The liquid crystal layer 30 is enclosed with Nematic liquid crystal having the positive dielectric constant anisotropy and is aligned horizontally with the alignment film. As the liquid crystal layer 30, for example a liquid crystal material made by CHISSO CORPORATION having the refractive index anisotropy $\Delta n=0.100$, the dielectric constant anisotropy $\Delta \in =11$ at the temperature 25 degrees is used. The liquid crystal layer 30 is aligned horizontally in the condition of low-voltage applied, in other word at the time of power-off, and is aligned vertically in the condition of high-voltage applied, in other word at the time of power-on.

The spacer 31 is located to control the cell gap, and is columnar thing formed to be located between the substrate 10 and 20 in the reflective region Ar1 by for example the lithography. In more detail, the cell gap G2 in the transmissive region Ar2 is adjusted with the thickness of the spacer 31 and the thickness of the interval adjustment layer 22, further this cell gap G2 minus the thickness of interval adjustment layer 22 is equivalent to the cell gap G1 in the reflective region Ar1.

Next, the method of producing the liquid crystal display in connection with the present embodiment of the above-mentioned construction will be explained by referring to FIG. 6 to 8.

Figure 6A:
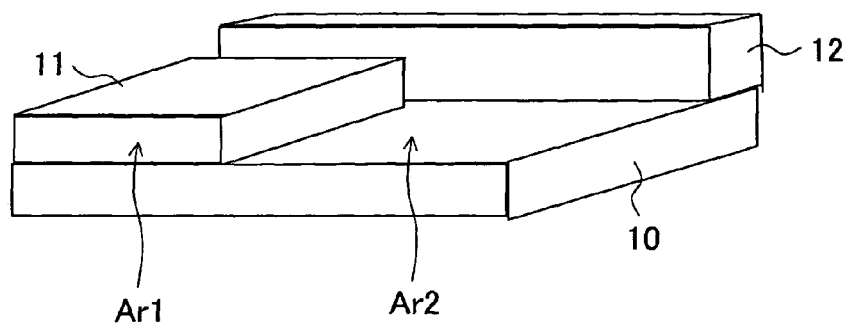
FIGS. 6A and 6B are process views of the method of producing the liquid crystal display in connection with the first to fourth embodiments.

As the manufacturing process of the first substrate side, first, as shown in FIG. 6A, a switching element consisting of TFT etc., an auxiliary capacitance line, a gate line and the signal line 12 is formed on the first substrate 10. As well, in FIGS. 6A and 6B for simplification of figures, things except the signal line 12 are shown as the element layer 11.

Figure 6B:
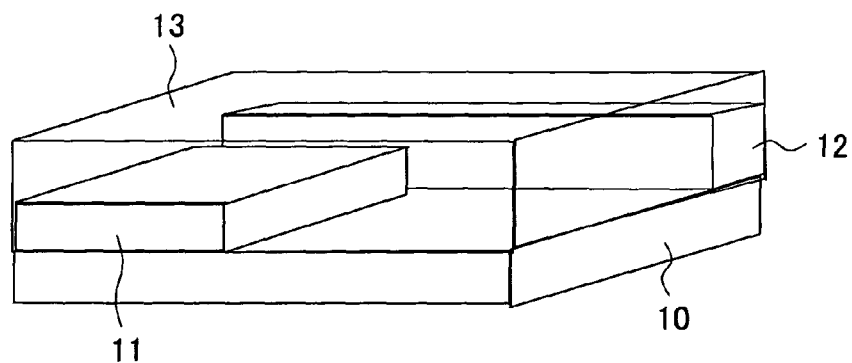

Next, as shown in FIG. 6B, for planarizing unevenness by formation of the element layer 11 and the signal line 12, the light-sensitive film 13 consisting of transparent resist is formed in all surface of the first substrate 10. As the transparent resist, for example positive resist PC315G made by JSR CORPORATION is used.

Figure 7A:
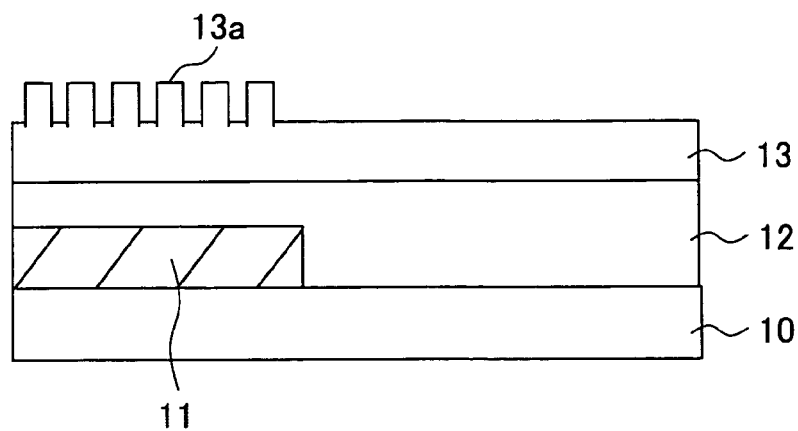
FIG. 7A to 7C are process cross-sectional views of the method of producing the liquid crystal display in connection with the first to fourth embodiments.

Next, as shown in FIG. 7A, after prebaking, by exposing the light-sensitive film 13 in the reflective region Ar1 with a quantity of exposure that can expose only the surface layer of the light-sensitive film 13, uneven shape 13a is formed on the light sensitive film 13. The prebaking is performed, for example at the temperature of 120 degrees.

Figure 7B:
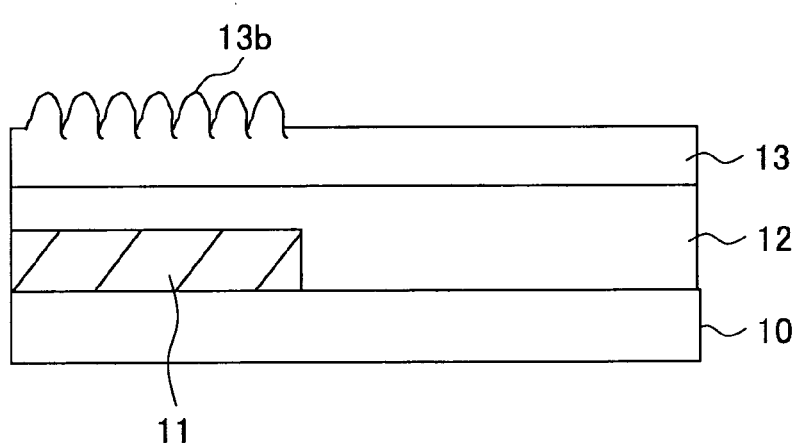

Next, as shown in FIG. 7B, by transforming the uneven shape on the light-sensitive film 13 after post-baking, the uneven shape 13a is transformed to a rounded uneven shape 13b. The post-baking is performed, for example at the temperature of 220 degrees. As mentioned above, by making the uneven shape rounded, the diffusion performance of the reflective electrode formed by coating this unevenness afterward can be improved.

Figure 7C:
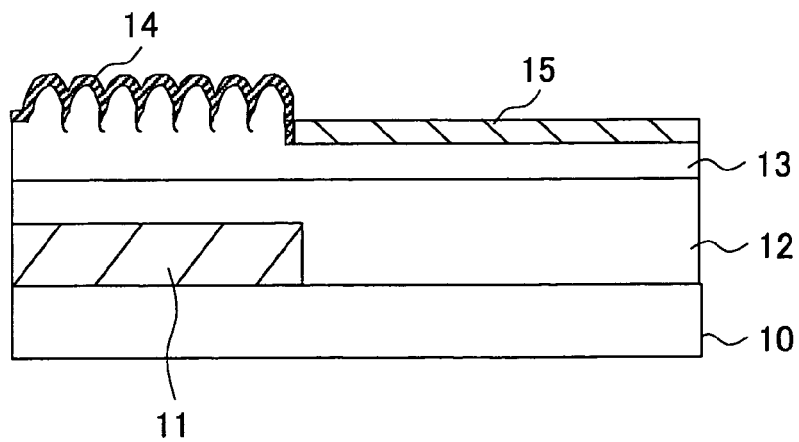

Next, as shown in FIG. 7C, by depositing the material of the reflective electrode such for example as silver and patterning, the reflective electrode 14 coating only the light-sensitive film 13 on which the uneven shape is formed in the reflective region Ar1 is formed. Subsequently, by depositing the material of the transparent electrode such as ITO etc. and patterning, the transparent electrode 15 is formed at the transmissive region Ar2.

Figure 8A:
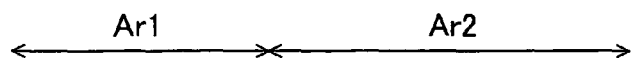
FIG. 8A to 8D are process cross-sectional views of the method of producing the liquid crystal display in connection with the first to fourth embodiments.
Figure 8A:

The manufacturing process of the second substrate side is, first as shown in FIG. 8A, the color filter 21 on the second substrate 20 consisting of a transparent insulating substrate such as glass etc. In the formation of the color filter 21, by applying resin such as polyimide etc. that pigment and dye is diffused and patterning, the red (R), green (G) or blue (B) color filter is formed in each pixel.

Figure 8B:
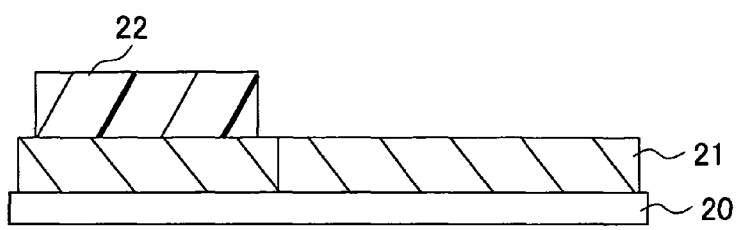

Next, as shown in FIG. 8B, by applying the transparent resist and patterning by exposure and image development and leaving transparent resist only on the reflective region Ar1, the interval adjustment layer 22 is formed. At this time, as explained above by referring to FIG. 5, the interval adjustment layer 22 is formed so that the end of the interval adjustment layer 22 is located inside the reflective region Ar1 in a distance d at least on the boundary between the reflective region Ar1 and the transmissive region Ar2.

Figure 8C:
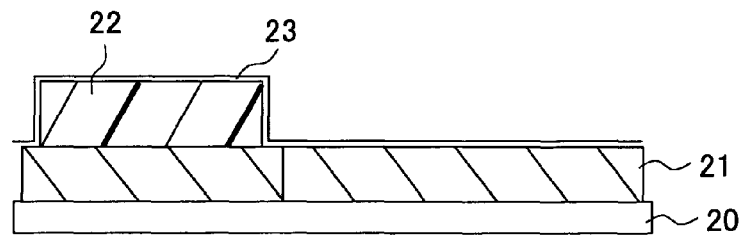

Next, as shown in FIG. 8C, by forming the ITO film in all surface of the second substrate 20, the counter electrode 23 is formed.

Figure 8D:
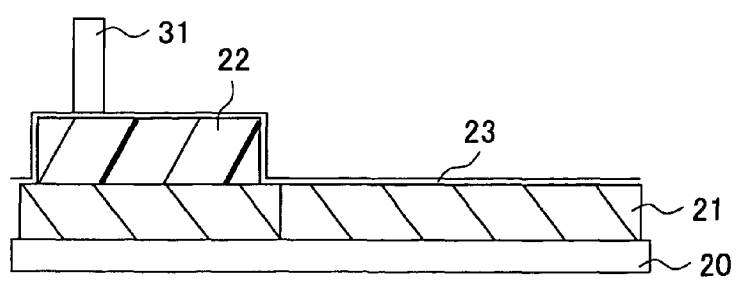

Next, as shown in FIG. 8D, the columnar spacer 31 is formed in the reflective region Ar1 with lithography. The gap as an interval between the substrates is provided by the thickness of the spacer 31 and the thickness of the interval adjustment layer 22. If the gap is too small, manufacturing is difficult, further, the modulation of the light is not enough. If the gap is too large, the necessary drive voltage becomes high and the speed of response becomes slow, hence in considering of these, the thickness of the spacer 31 is set. For example, it is preferable that the thickness of the spacer 31 is approximately 2.5 µm.

As the subsequent manufacturing process, the alignment film is formed on the first substrate 10 and the second substrate 20, and by for example the alignment process is performed. As well this alignment process can be adopted the photo-alignment method that aligns by irradiating with ultraviolet ray.

Subsequently, by sticking the first substrate 10 and the second substrate 20 with using seal material and injecting the Nematic liquid crystal between the substrates, the liquid crystal cell 1 is completed.

By attaching the retardation film 4 and the polarizer 2 on the upper side of the this liquid crystal cell 1, in other word on the side near the second substrate 20 and attaching the polarizer 3 on the lower side, the liquid crystal display shown in FIG. 1 is produced.

According to the liquid crystal display in connection with the above-mentioned present embodiment, by setting the interval adjustment layer 22 on the second substrate 20 for adjusting cell gap between the reflective region Ar1 and the transmissive region Ar2, the boundary between the reflective region Ar1 and the transmissive region Ar2 is planarized on the side of the first substrate 10.

Figure 9:
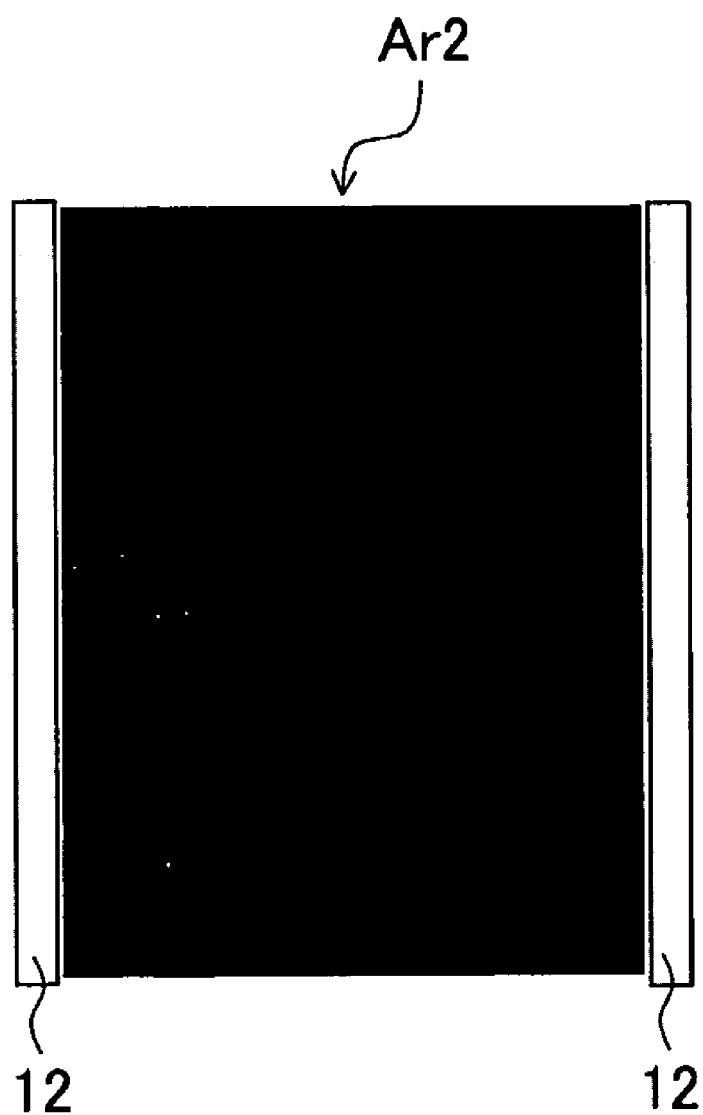
FIG. 9 is a figure to explain effects of the liquid crystal display in connection with the first embodiment.

Hence, since also around the transmissive region Ar2 retardation is controlled uniformly, the light leakage is prevented. By producing the liquid crystal display of the above-mentioned construction, it is confirmed that the light leakage around the transmissive region Ar2 disappears as shown in FIG. 9. Moreover, in the liquid crystal display in connection with the present embodiment, when the contrast is measured with applying voltage to the liquid crystal layer 30, the contrast ratio is 120.

Figure 10:
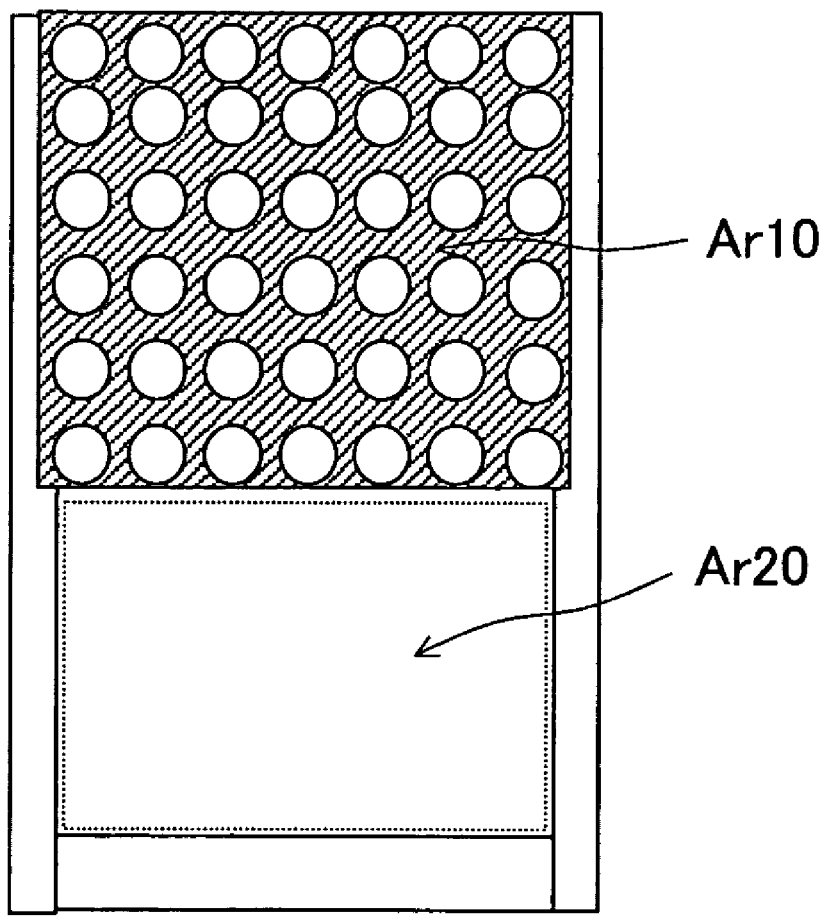
FIG. 10 is a plan view of one liquid crystal cell of existing example.
Figure 11:
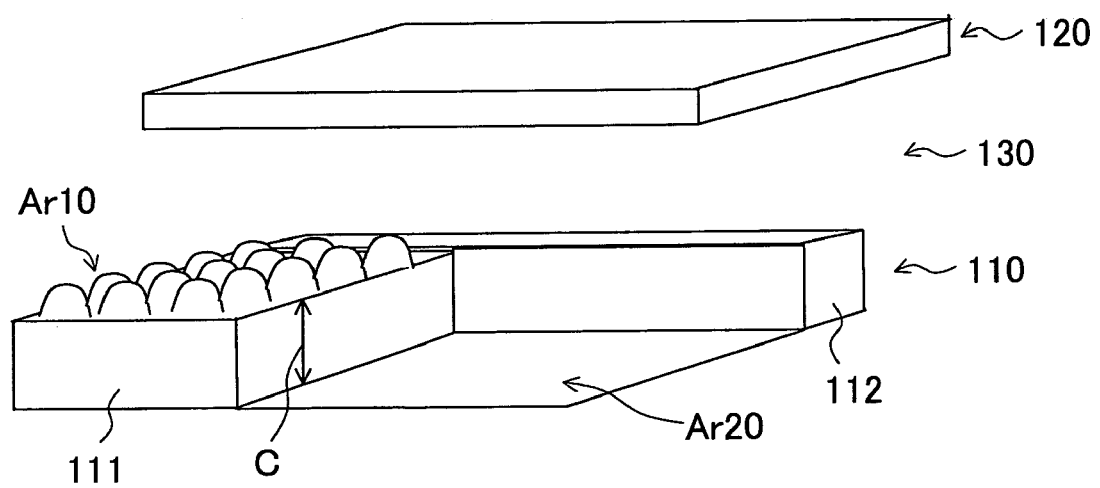
FIG. 11 is a perspective view of one pixel to explain the construction of the liquid crystal cell.
Figure 12:
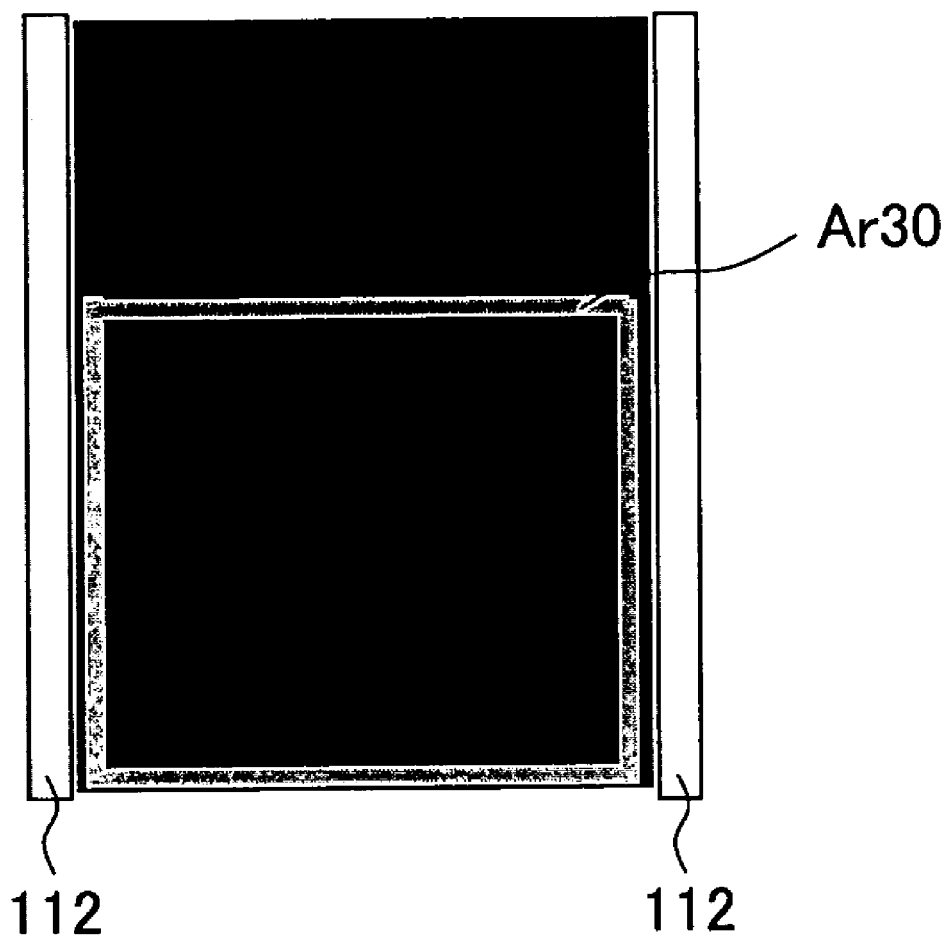
FIG. 12 is a figure to explain effects of existing liquid crystal display.

In addition, for comparative example, the liquid crystal display having the construction shown in FIG. 10 to 11 is produced so that the step C is formed so that the step C between the reflective region Ar1 and the transmissive region Ar2 on the side of the first substrate 110 is approximately 2 µm and the spacer 111 of 2.5 µm in the reflective region 110 is formed, the interval adjustment layer on the second substrate 120 is not formed and liquid crystal materials etc. similar to the first embodiment as the other are used. As the liquid crystal display of this comparative example, as shown in FIG. 12, the light leakage Ar30 is appeared around the transmissive region. Moreover, in the liquid crystal display of this comparative example, when the contrast is measured with applying voltage to the liquid crystal layer 130, the contrast ratio is 60.

As mentioned above, according to the liquid crystal display in connection with the present embodiment, the normally black mode combination type liquid crystal display preventing the light leakage around the transmissive region Ar2 and improving the contrast ratio can be realized.

Moreover, as the method of producing the liquid crystal display in connection with the present embodiment, as shown in FIG. 6 to 7, after planarizing the step arising from the element layer 11 on the first substrate 10 with the light-sensitive film 13 such as transparent resist etc., by exposing only the surface of the light-sensitive film 13 on the reflective region Ar1, unevenness is formed on the surface. Hence, since the planarization of the reflective region Ar1 and the transmissive region Ar2 and unevenness forming for diffuse-reflecting of the reflective region Ar1 can be performed at the same time, the liquid crystal display can be produced without complicating the manufacturing process.

The Second Embodiment

In the liquid crystal display in connection with the present embodiment, in addition to the construction similar to the first embodiment, the thickness of the liquid crystal layer 30 on the transmissive region Ar2 is changed to differ at each color filter.

Figure 13A:
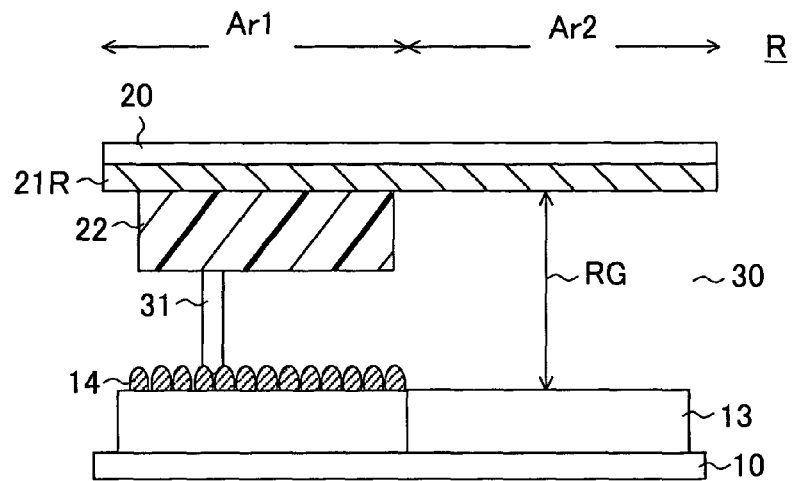
FIG. 13A to 13C are cross-sectional views of one pixel of the liquid crystal display in connection with the second embodiment, and 13A is a cross-sectional view of the red (R) pixel, and 13B is a cross-sectional view of the green (G) pixel, and 13C is a cross-sectional view of the blue (B) pixel.
Figure 13B:
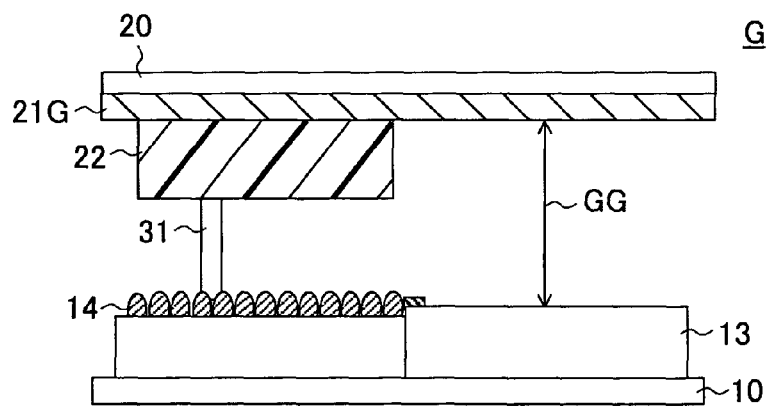
Figure 13C:
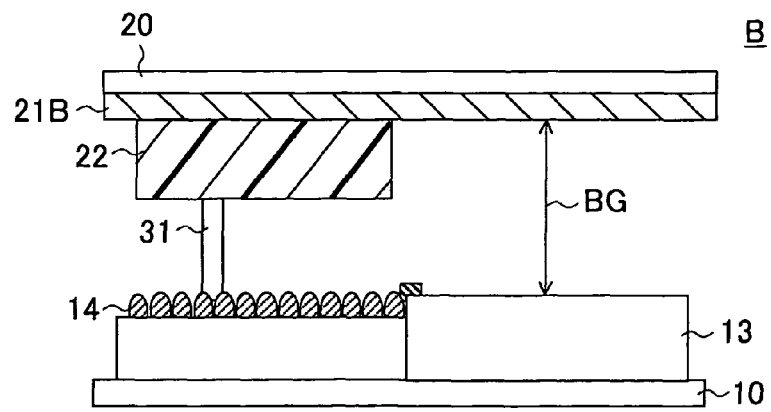

FIG. 13A is a cross-sectional view of the red (R) pixel, FIG. 13B is a cross-sectional view of the green (G) pixel, and FIG. 13C is a cross-sectional view of the blue (B) pixel.

As shown in FIG. 13A, at the red pixel a red filter 21R is formed on the second substrate 20, as shown in FIG. 13B, at the green pixel a green filter 21G is formed on the second substrate 20, and as shown in FIG. 13C, at the blue pixel a blue filter 21B is formed on the second substrate 20. About the above-mentioned point, it is similar to the first embodiment.

In the present embodiment, it is set so that the cell gap RG of the transmissive region Ar2 in the red pixel and the cell gap GG of the transmissive region Ar2 in the green pixel and the cell gap BG of the transmissive region Ar2 in the blue pixel are different.

In the present embodiment, the cell gap RG, GG, and BG of the transmissive region Ar2 in each pixel is changed by the thickness of the light-sensitive film 13 in the transmissive region Ar2. As well, by changing the thickness of each color filter 21R, 21G, 21B in each pixel, each cell gap RG, GG and BG of the transmissive region Ar2 in each pixel may be changed.

In the following, the reason of changing each cell gap RG, GG, BG of the transmissive region Ar2 in each pixel is explained.

In the case that the liquid crystal layer 30 of the liquid crystal cell 1 is set to operate as a quarter-wave plate and a circular polarizer in the range of pai/4 to pai/2 is produced by the retardation film 4 that is a half-wave plate and the liquid crystal cell 1, the realization of displaying black so that the light cannot be transmitted completely at all wavelength because of mismatch of the wavelength dispersion of the retardation film such as polycarbonate and Arton that are mainstream now and the liquid crystal molecule is very difficult, in particular in the transmissive region Ar2.

Figure 14:
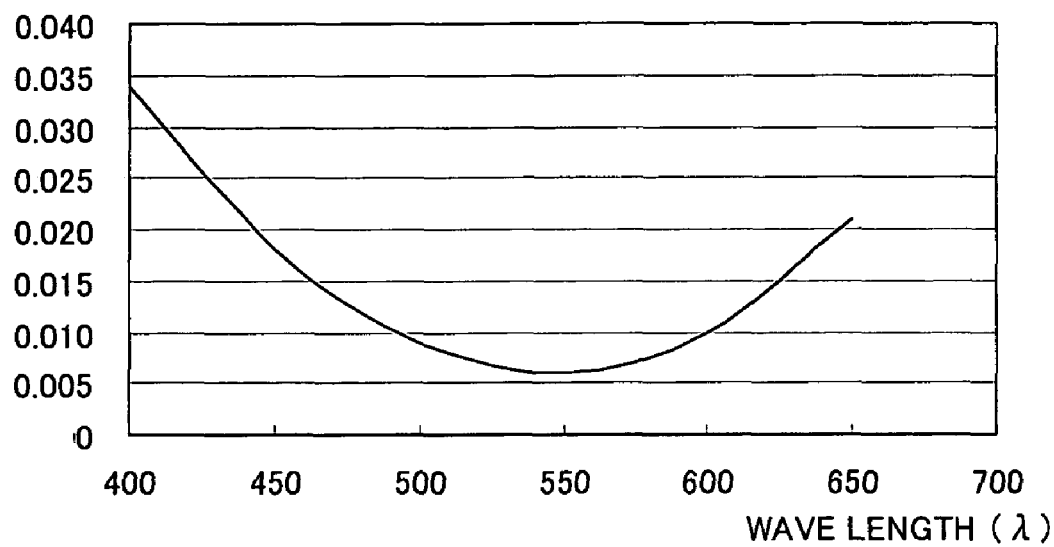
FIG. 14 is a figure showing the relationship of the wavelength of light and the transmittance in the case of constructing the normally black mode liquid crystal display.

FIG. 14 is, a figure showing the relationship of the wavelength of light and the transmittance in the case of constructing the normally black mode liquid crystal display as shown in FIG. 2A to 2D. As well, FIG. 14 is the applied voltage to the liquid crystal layer is in the condition of low-voltage applied, that is to say, in the case that the transmittance of the transmissive region is the minimum.

As shown in FIG. 14, even if the wavelength of 550 nm that the visibility is set as the highest displaying black that the luminance is the lowest, the transmittance of the blue side of shorter wavelength than 550 nm and the red side of the longer wavelength than 550 nm becomes high, so obtaining displaying black at all wavelength is difficult. Hence, for making displaying black at all wavelength easy, each cell gap RG, GG, BG is changed.

Figure 15:
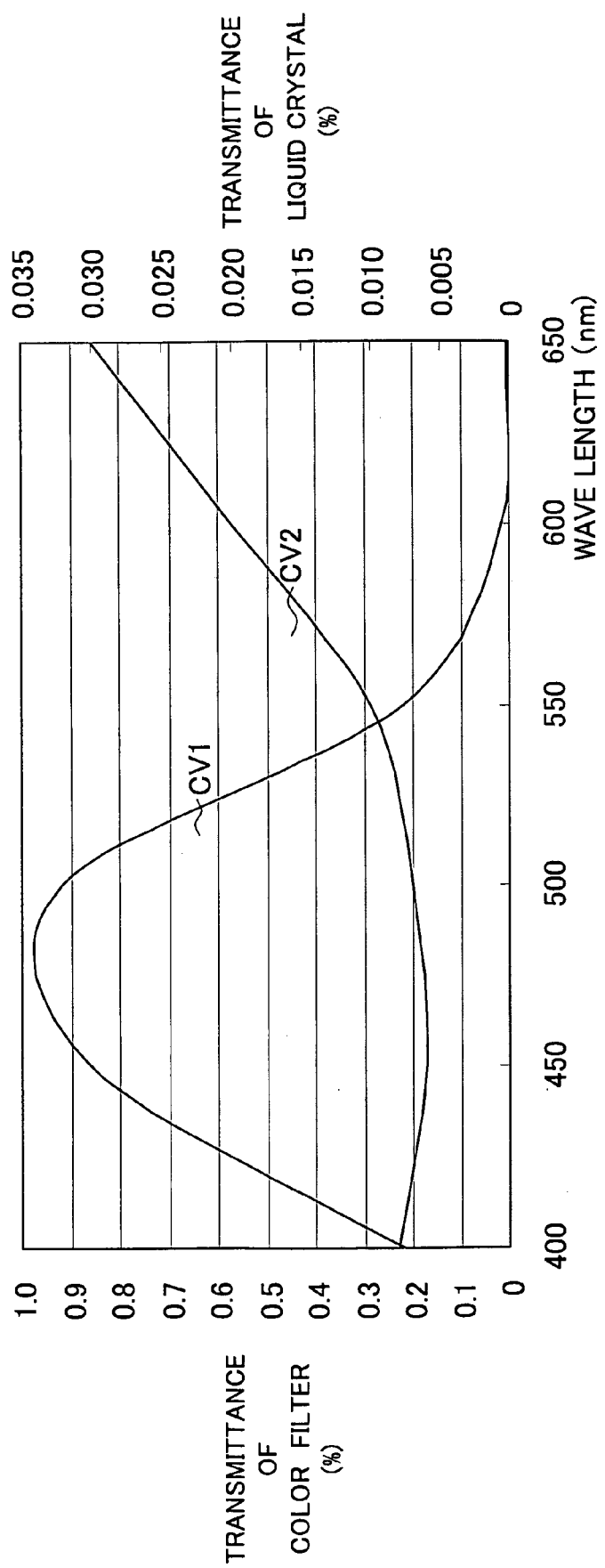
FIG. 15 is a figure showing the relationship of the transmittance of the blue filter and the transmittance of the liquid crystal layer for each wavelength of light.

FIG. 15 is a figure showing the relationship of the transmittance of the blue filter and the transmittance of the liquid crystal layer for each wavelength of light. CV1 in FIG. 15 shows the transmittance of the blue filter and CV2 shows the transmittance of the liquid crystal layer.

In FIG. 15, by adjusting the cell gap BG so that the transmittance of light of wavelength of 400 to 550 nm being transmitted the blue filter is set to the minimum, the result of the case of setting retardation of the liquid crystal layer 30 is showed. Herewith, for the red light of wavelength of 550 nm or more the transmittance of the liquid crystal layer 30 becomes higher, but the blue filter does not transmit the red light, hence for a result in the blue pixel the transmittance of the light at all wavelength is made small and favorable displaying black can be possible.

In the red pixel and the green pixel also, in a similar way by adjusting the cell gap and retardation of the liquid crystal layer 30 so that the transmittance of light of wavelength range that each filter transmits, light leakage in all pixels at the time of power-off, in other word displaying black can be improved significantly. As mentioned above, by changing the cell gap in each pixel of red (R), green (G), blue (B) so that retardation of the liquid crystal layer 30 is optimized, displaying black can be realized easily.

Figures 16A, 16B:
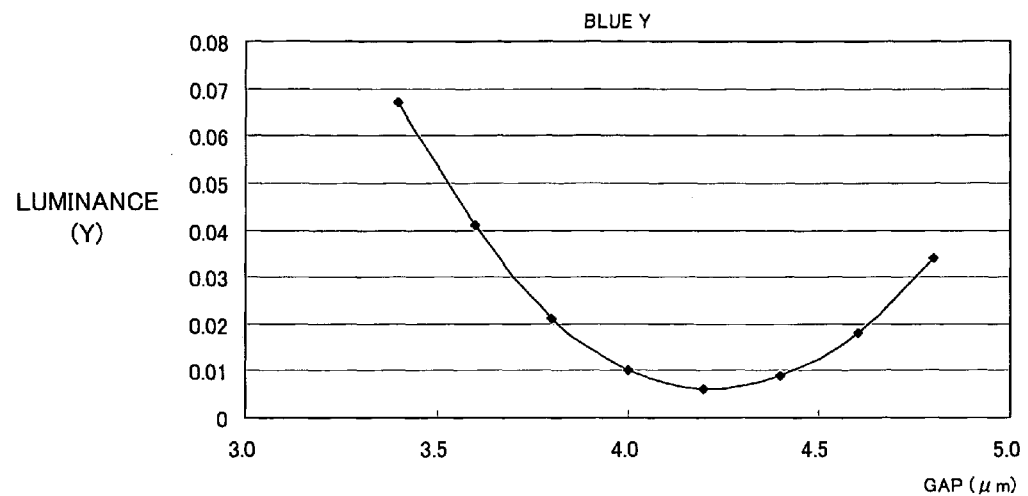
FIG. 16A is a figure showing the relationship of the cell gap at the time of power-off in the blue pixel and the luminance Y, and 16B is a figure showing the property at the time of power-off.

FIG. 16A is a figure showing the relationship of the cell gap at the time of power-off in the blue pixel and the luminance Y, and FIG. 16B is a figure showing the property at the time of power-off.

Figures 17A, 17B:
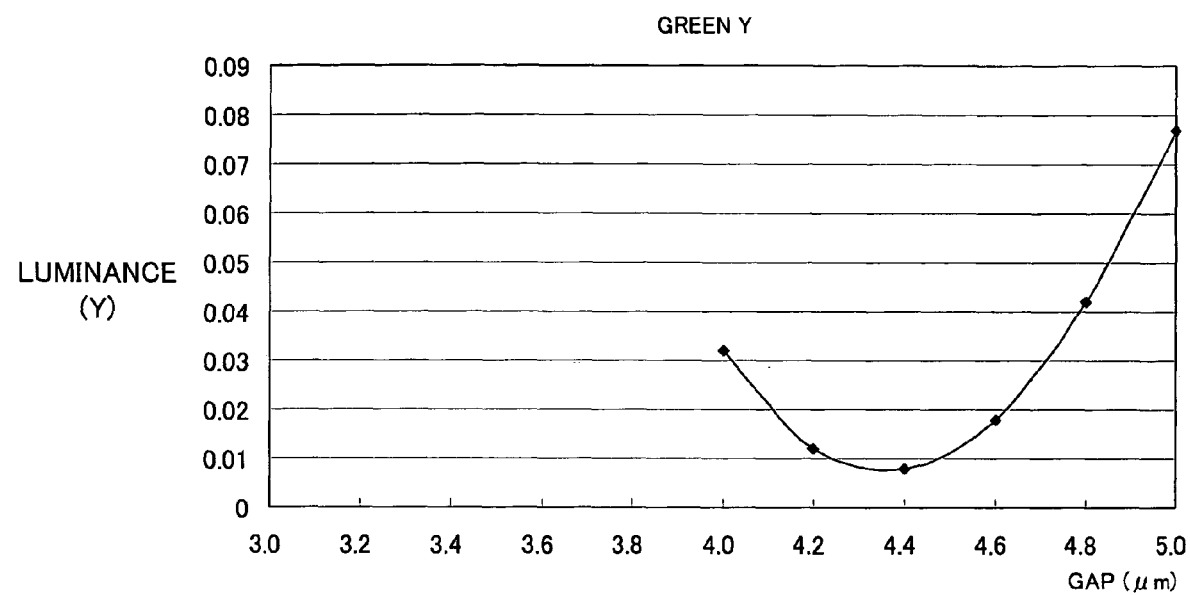
FIG. 17A is a figure showing the relationship of the cell gap at the time of power-off in the green pixel and the luminance Y, and 17B is a figure showing the property at the time of power-off.

FIG. 17A is a figure showing the relationship of the cell gap at the time of power-off in the green pixel and the luminance Y, and FIG. 17B is a figure showing the property at the time of power-off.

Figures 18A, 18B:
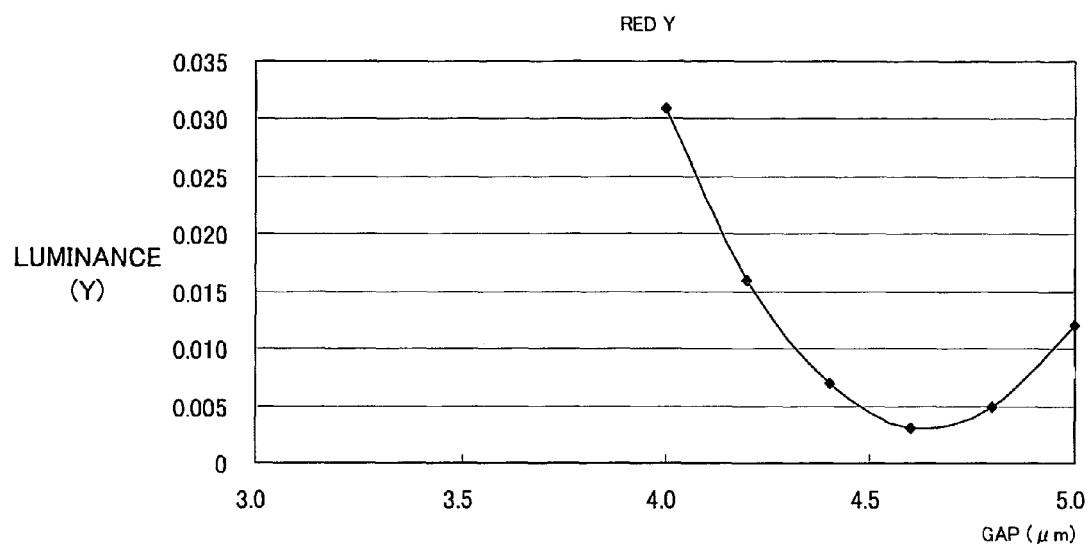
FIG. 18A is a figure showing the relationship of the cell gap at the time of power-off in the red pixel and the luminance Y, and 18B is a figure showing the property at the time of the time of power-off.

FIG. 18A is a figure showing the relationship of the cell gap at the time of power-off in the red pixel and the luminance Y, and FIG. 18B is a figure showing the property at the time of power-off.

In FIG. 16 to 18, x, y is parameters showing hue and chromaticness, Y is showing luminance.

From FIG. 16, in the blue pixel, in the case of the cell gap to 4.2 μm, the luminance is the smallest. Moreover, from FIG. 17, in the green pixel, in the case of the cell gap to 4.4 μm, the luminance is the smallest. Moreover, from FIG. 18, in the red pixel, in the case of the cell gap to 4.6 μm, the luminance is the smallest. As mentioned above, by setting the cell gap RG>GG>BG the most favorable displaying black is obtained, and it is preferable that the contrast becomes the highest. In the case of controlling the cell gap as above-mentioned, according to measuring the contrast, a very high value was obtained, as the contrast ratio is 160.

Figure 19:
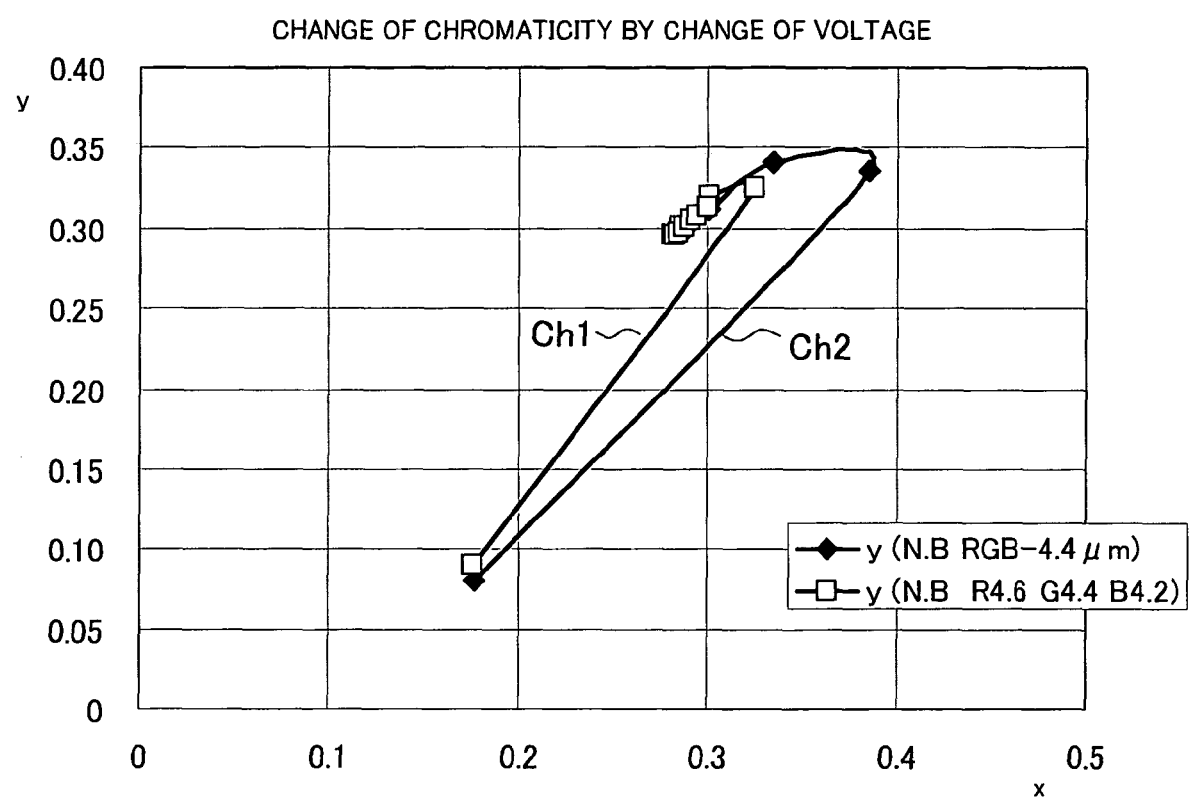
FIG. 19 is a figure showing the relationship of voltage applied to the liquid crystal layer and chromaticity in the liquid crystal display in connection with the second embodiment.

FIG. 19 is a figure showing the relationship of voltage applied to the liquid crystal layer and chromaticity in the liquid crystal display in connection with the present embodiment.

In FIG. 19, Ch1 is the graph in the case of setting the cell gap RG=4.6 μm, GG=4.4 μm and BG=4.2 μm, Ch2 is the graph in the case of setting each red (R), green (G), blue (B) pixel 4.4 μm. In each graph, the chromaticity changes larger on the right, as the transmittance becomes larger.

As shown in FIG. 19, by changing the cell gap in each red (R), green (G), blue (B) pixel, the color shift in half tone from displaying black to displaying white can be decreased. The normally black mode has a problem that black is seen as blue in displaying black, by changing the cell gap in each red (R), green (G), blue (B) pixel, displaying black can be improved significantly.

Next, the method of producing the liquid crystal display in connection with the present embodiment will be explained.

As mentioned above, to change the cell gap in each red (R), green (G), blue (B) pixel, for example, in the manufacturing process of unevenness in the reflective region Ar1 as shown in FIG. 7A and in the transmissive region Ar2, only the surface part of the light-sensitive film 13 is exposed. By controlling a quantity of exposure, the thickness of the light-sensitive film 13 in the transmissive region can be changed in each red (R), green (G), blue (B) pixel. For example, in the case of setting the cell gap RG>GG>BG, by not exposing in the blue pixel and exposing in each red and green pixel and exposing in the red pixel a larger quantity of exposure than in the green pixel, it can be realized. On the other hand, in the case of setting the cell gap RG=GG>BG, for example by not exposing in the blue pixel and exposing at a same quantity for each red and green pixel, it can be realized.

At this time, it is preferable of the construction that the step is not left in the region that light is transmitted. Consequently, it is produced so that the step is made on the signal line or in the reflective region, that light is not transmitted. For the step is made in the reflective region, as shown in FIG. 13A to 13C, the reflective electrode 14 is patterned so that the part of the step is coated.

As for the other method to change the cell gap in each red (R), green (G), blue (B) pixel, in the forming process of the color filter 21 on the second substrate 20 shown in FIG. 8A, the method of changing the thickness of the color filter in each red (R), green (G), blue (B) pixel can be adopted.

As mentioned above, in the exposing process of forming unevenness on the surface of the light-sensitive film 13 in the reflective region Ar1, by controlling a quantity of exposure in also the transmissive region Ar2 and exposing in each red (R), green (G), blue (B) pixel, or changing the thickness of the color filter in each red (R), green (G), blue (B) pixel, it is possible to change the cell gap in each red (R), green (G), blue (B) pixel. Hereby, without complicating the manufacturing process, as mentioned above, the liquid crystal display having high contrast can be produced.

The Third Embodiment

The present embodiment is similar to the second embodiment at the point of setting the most suitable thickness of the cell gap or the thickness of the liquid crystal display 30 in each color filter, but further making the twist angle of the liquid crystal molecule in the liquid crystal layer 30 to be 0 degrees.

Figure 20:
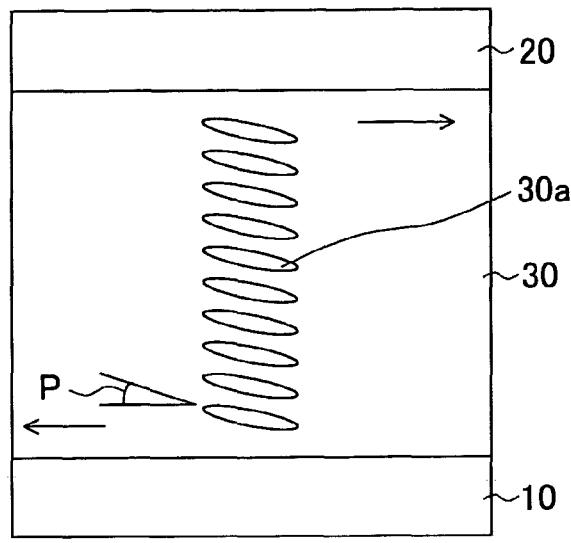
FIG. 20 is a figure to explain the alignment of the liquid crystal layer in connection with the third embodiment.

FIG. 20 is a figure to explain the alignment of the liquid crystal layer 30 in connection with the present embodiment.

In the present embodiment, the liquid crystal layer 30 charged between the first substrate 10 and the second substrate 20 has the Homogenious alignment. The alignment that as shown in FIG. 20 a liquid crystal molecule 30a of the liquid crystal layer 30 is not twisted up and down and the long axis of the liquid crystal molecule 30a turns to the same direction is called as Homogenious alignment. The liquid crystal molecule 30a is tilted at the predetermined pretilt angle p for the first substrate 10 and the second substrate 20. Said Homogenious alignment can be realized by rubbing parallel and reversed for the alignment film formed on the first substrate 10 and the second substrate 20 without being shown in a figure, as shown with an arrow in a figure. In addition, the formation of the liquid crystal layer 30 having Homogenious alignment can be realized with the photo-alignment method that aligns by irradiating the ultra-violet ray, along with the first embodiment.

In the following, the display performance in the case of using the liquid crystal layer 30 having Homogenious alignment in connection with the present embodiment is explained by using Poincare sphere shown in FIG. 21.

Figure 21:
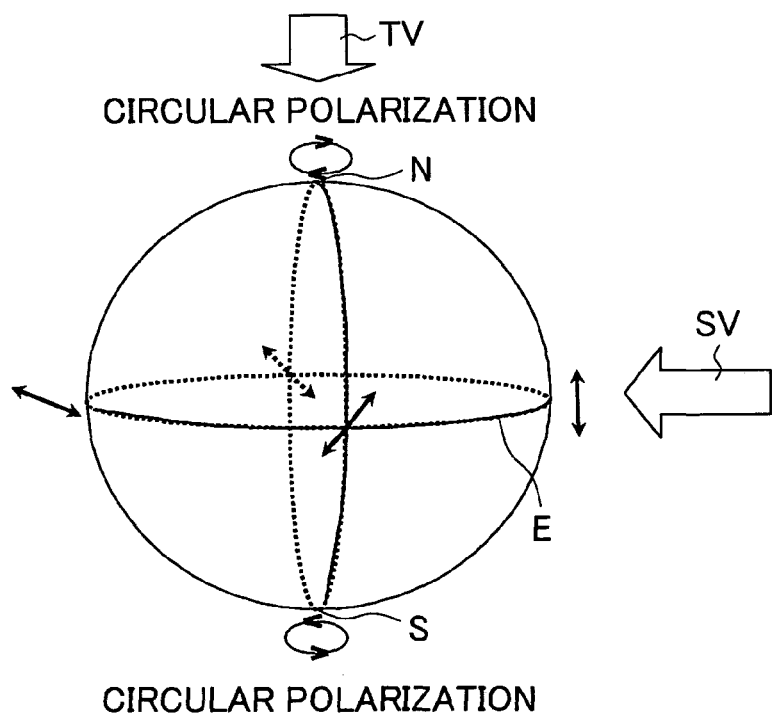
FIG. 21 is a figure to explain Poincare sphere.

Poincare sphere shown in FIG. 21 is showing the polarization for the position. At the point of the North Pole N and the South Pole S of Poincare sphere, it is shown that the light is the circular polarization, at the point of the equator E, it is shown that the light is the linear polarization. At each point of the equator, the direction of the polarizing axis of the linear polarization is different. At the other point, it is shown that the light is elliptical polarization.

Figure 22A:
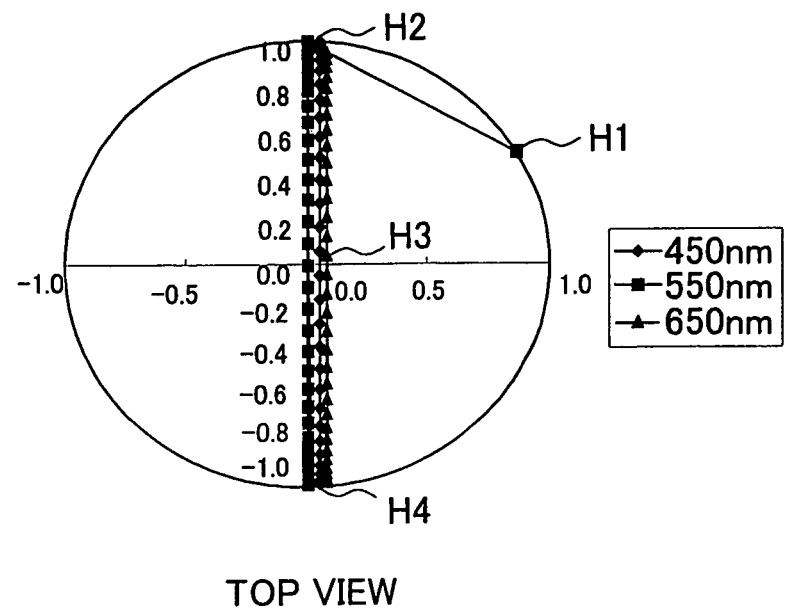
FIG. 22A to FIG. 22B are figures showing the locus of the polarization on Poincare sphere in the case that the liquid crystal layer is adopted Homogenious alignment.
Figure 22B:
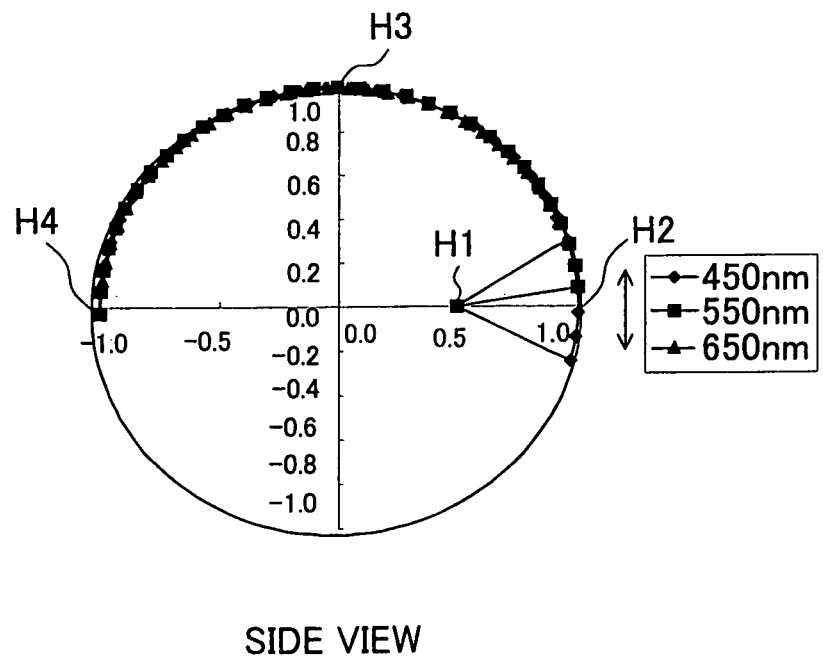

FIGS. 22A and 22B are figures showing the locus on Poincare sphere of the light of the red (R) of wavelength 650 nm and the green (G) of wavelength of 550 nm and the blue (B) of the wavelength of 650 nm, in the minimum transmittance of the transmissive region Ar2. FIG. 22A is a figure seen from the arrow TV of 21, and FIG. 22B is a figure seen from the arrow SV of FIG. 21.

Figure 23:
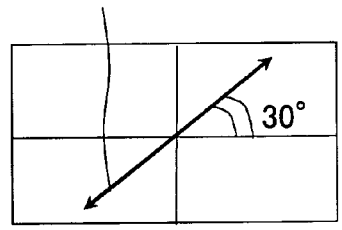
FIG. 23 is a figure showing one example of the preferable construction of the liquid crystal display in the case that the liquid crystal layer is adopted Homogenious alignment.
Figure 23:
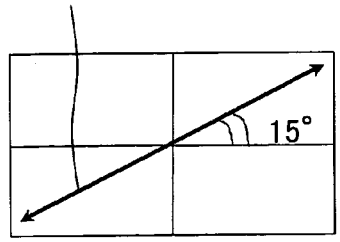
Figure 23:
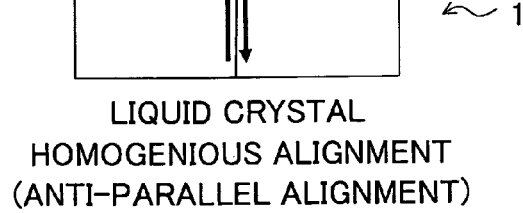

The locus shown in FIGS. 22A and 22B is obtained in the case of adjusting the cell gap in each red (R), green (G), blue (B) pixel so that the transmittance becomes the minimum and setting so that the light is on the equator of Poincare sphere, that is to say at all wavelength the light becomes the linear polarization. FIG. 23 is a figure showing one example of the construction of the liquid crystal display at this time.

As shown in the FIG. 23, the retardation axis of the retardation film 4 is set to be rotated clockwise 60 degrees for the rubbing direction of the upper side near the color filter substrate of the liquid crystal cell 1 and further the transmission axis of the polarizer 2 is set to be rotated clockwise 15 degrees for the retardation axis of the retardation film 4. Moreover, transmission axis of the polarizer 3 is set to be rotated anti-clockwise 45 degrees for the rubbing direction of the lower side near the TFT substrate of the liquid crystal cell 1.

Figure 24A:
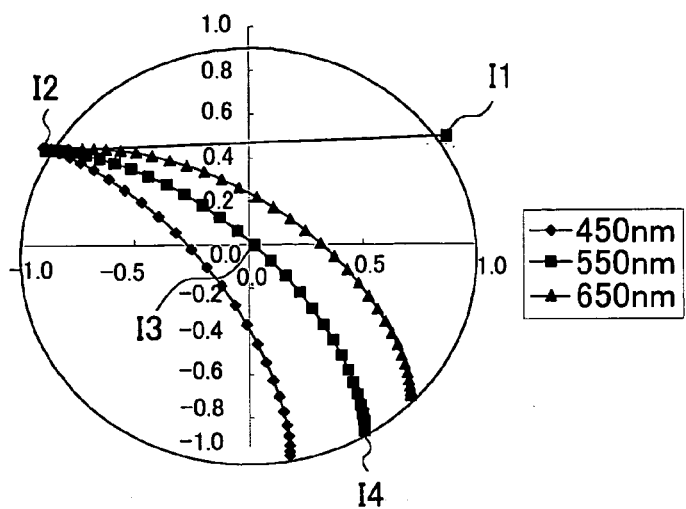
FIGS. 24A and 24B are figures showing the locus of the polarization on Poincare sphere in the case that the liquid crystal layer is adopted Twist alignment as a comparative example.
Figure 24B:
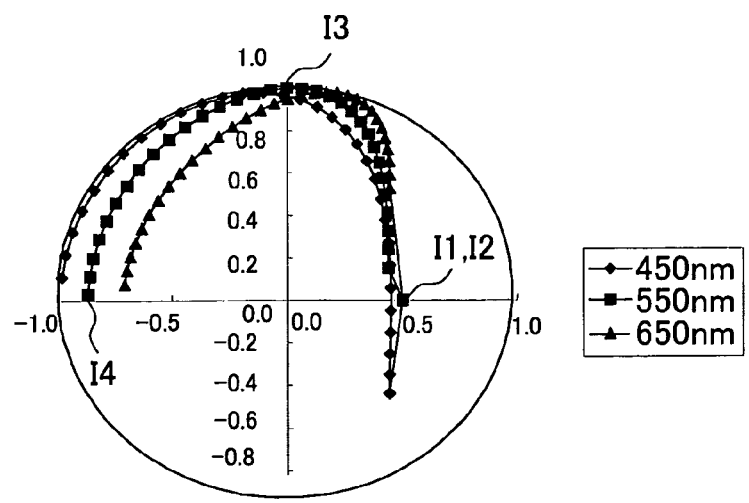

In addition, as a comparative example, in FIGS. 24A and 24B, in the case of using the liquid crystal layer having Twist alignment, the locus on Poincare sphere of each wavelength of light is shown at the minimum transmittance of the transmissive region. FIG. 24A is a figure seen from the arrow TV of FIG. 21, and FIG. 24B is a figure seen from the arrow SV of FIG. 21.

Figure 25:
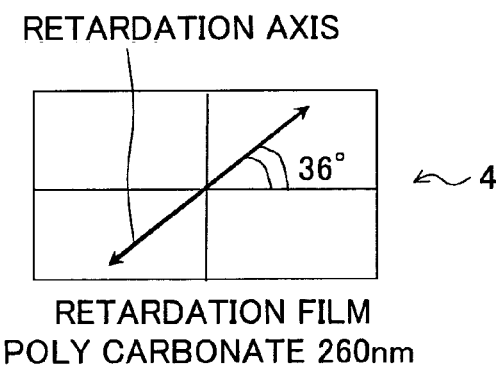
FIG. 25 is a figure showing one example of the preferable construction of the liquid crystal display in the case that the liquid crystal layer is adopted Twist alignment.
Figure 25:
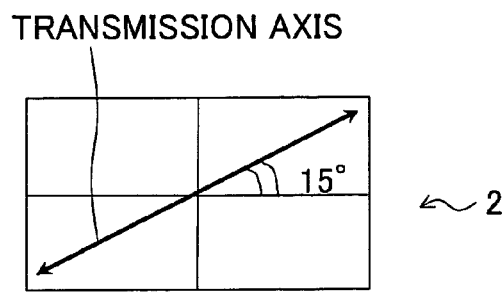
Figure 25:
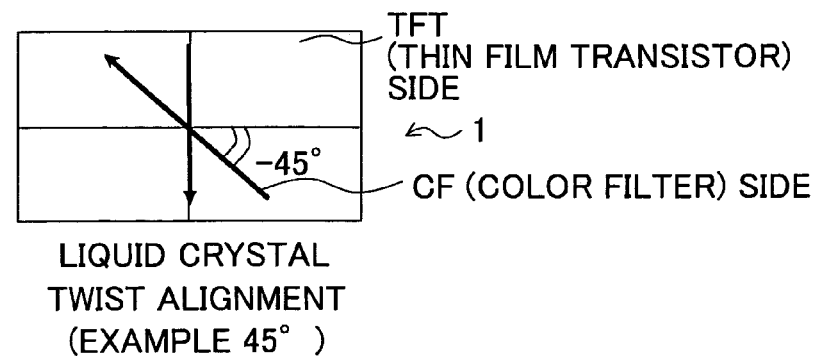
Figure 25:
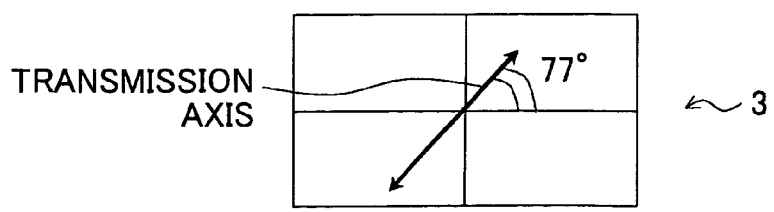

FIGS. 24A and 24B are showing the locus in the case of adjusting the cell gap in each red (R), green (G), blue (B) pixel so that the transmittance becomes the minimum and setting so that the light is on the equator of Poincare sphere, that is to say at all wavelength the light becomes the linear polarization. FIG. 25 is a figure showing one example of construction of the liquid crystal display at this time.

As shown in FIG. 25, in the case of Twist alignment of 45 degrees, the retardation axis of the retardation film 4 is set to be rotated clockwise 99 degrees for the rubbing direction of the upper side near the color filter substrate of the liquid crystal cell 1 and further the transmission axis of the polarizer 2 is set to be rotated clockwise 21 degrees for the retardation axis of the retardation film 4. Moreover, transmission axis of the polarizer 3 is set to be rotated anticlockwise 13 degrees for the rubbing direction of the lower side near the TFT substrate of the liquid crystal cell 1.

A shown in FIGS. 22A and 22B, in the case that the alignment of the liquid crystal layer 30 is Homogenious alignment, the polarization when the red light, the green light, the blue light pass through the polarizer 2 and enter to the retardation film 4 is shown as the point H1 because each light is the linear polarization, the polarization after passing through the retardation film 4 as a half-wave plate is shown as the point H2, the circular polarization on the way of passing through the liquid crystal layer 30 is shown as the point H3, the polarization after passing through the liquid crystal layer 30 is shown as the point H4.

As mentioned above, in the case of adopting Homogenious alignment all of red light, green light and blue light pass nearly the same locus on Poincare sphere, that is to say each polarization is nearly corresponding. Consequently, by setting the transmission axis of the polarizer 3 to the linear polarization shown in the point H4, the transmittance becomes small and favorable displaying black can be realized.

On the other hand, as shown in FIGS. 24A and 24B, in the case that the alignment of liquid crystal layer 30 is Twist-alignment of 45 degrees, the polarization when the red light, the green light, the blue light pass through the polarizer 2 and enter to the retardation film 4 is shown as the point I1 because each light is the linear polarization, the polarization after passing through the retardation film 4 as a half-wave plate is shown as the point I2. However, on the way of passing through the liquid crystal layer 30 the green light becomes the circular polarization at the point I3, while the blue and the red light do not become the circular polarization. Also after passing through the liquid crystal layer 30, the green light is the polarization shown at the point I4, while the polarization of the blue and the red light is scattered. Therefore, by setting the transmission axis of the polarizer 3 in accordance with the polarization when the green light is the circular polarization shown in the point I4, the transmittance cannot be decreased and favorable displaying black cannot be obtained because the blue and the red light pass through.

In Homogenious alignment, since the alignment condition of the liquid crystal layer on the circle of the polarization moving is same, by changing the thickness of each pixel and optimize the retardation value, it is possible that the locus of each RGB light is nearly identified, so said result was obtained. Correspondingly, in the case of Twist alignment, since the alignment condition of the liquid crystal layer on the circle of the polarization moving is different, the locus of the polarization of each RGB light cannot be identified.

As well, in said explanation, the polarization of the light of each color in the case of entering light from the side of the polarizer 2 in FIG. 1 is explained. In practice, the backlight is located on the side of the polarizer 3, but the obtained result is the same.

Figure 26:
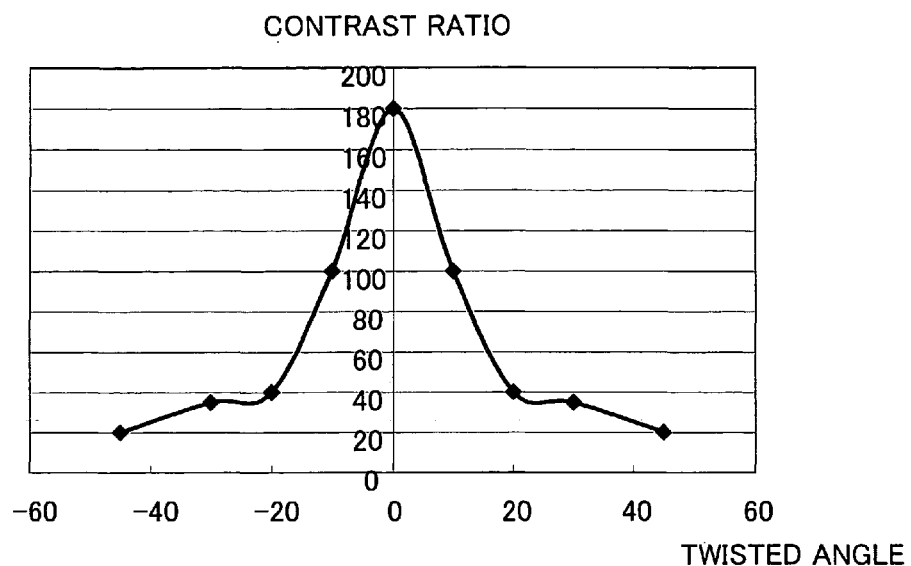
FIG. 26 is a figure showing the relationship of the twisted angle and the contrast ratio of the liquid crystal layer.

FIG. 26 is a figure showing the relationship of the twisted angle of the liquid crystal layer 30 and the contrast ratio.

As shown in FIG. 26, by twisting the twisted angle 0 degrees, that is to say, making Homogenious alignment without twisting the liquid crystal molecules, the contrast can be improved significantly.

Figure 27:
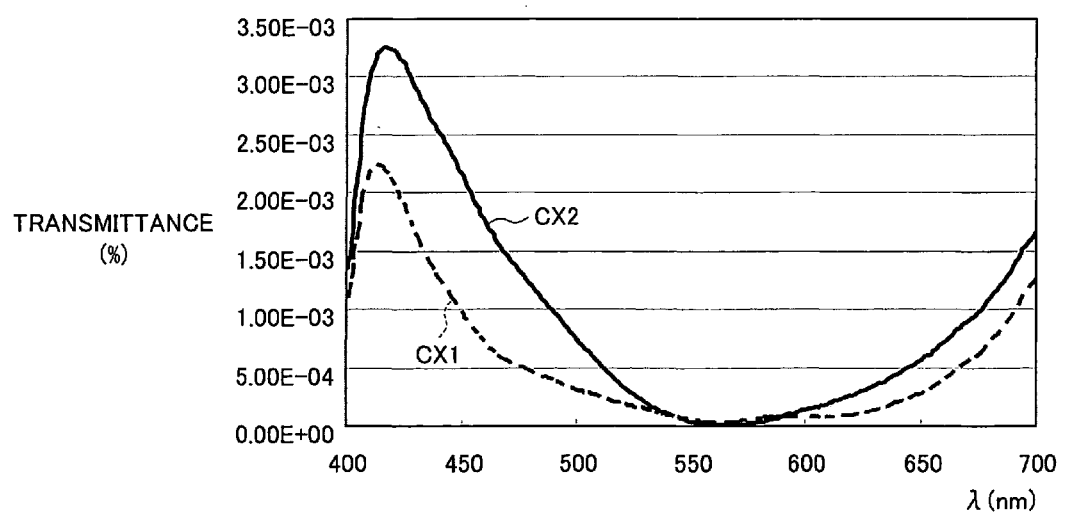
FIG. 27 is a figure showing the result to compare Homogenious alignment and Twist alignment as the transmittance of for each wavelength of the light at the time of power-off.

FIG. 27 is a figure showing the transmittance of the liquid crystal panels, that is to say the liquid crystal cell 1, the polarizer 2, 3 and the retardation film 4 for the wavelength of the light at the time of power-off. In a figure, Cx1 is showing the case of Homogenious alignment and Cx2 is showing Twist alignment of 45 degrees.

As shown in FIG. 27, in the case of setting so that the transmittance of the light of wavelength of 550 nm which is the most visible is 0, in comparison with the case of Twist alignment, the case of Homogenious alignment is more possible to reduce the transmittance of the blue side of shorter wavelength than 555 nm and the red side of longer wavelength than 550 nm. Therefore, by preventing the light of the red side and the blue side leakage, the problem that black becomes violet at the time of the minimum transmittance can be improved at the time of the minimum transmittance.

As mentioned above, according to the liquid crystal display in connection with the present embodiment, in addition to the construction of the second embodiment optimized the cell thickness with each red (R), green (G), blue (B) pixel by applying Homogenious alignment to the liquid crystal layer 30, the contrast at the time of the minimum transmittance and the chromaticity of black can be improved significantly.

The Fourth Embodiment

Figure 28:
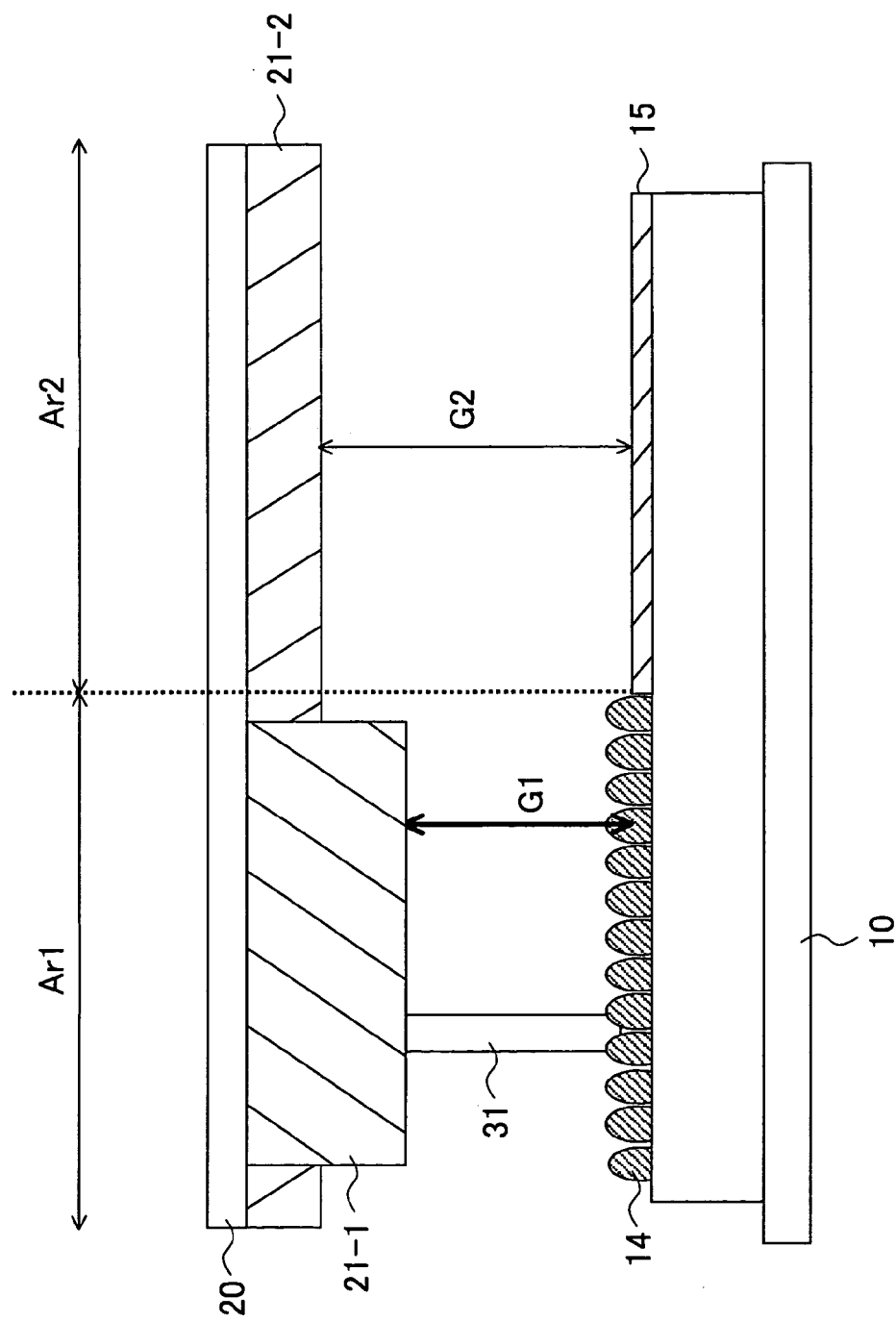
FIG. 28 is a cross-sectional view of one pixel of the liquid crystal cell in the liquid crystal display in connection with the fourth embodiment.

FIG. 28 is a cross-sectional view of one pixel of the liquid crystal cell in the liquid crystal display in connection with the present embodiment.

In the present embodiment, as shown in FIG. 28, as the color filter 21-1 in the reflective region Ar1 and the color filter 21-2 in the transmissive region Ar2, the discrete color filter having the discrete thickness of film is adopted. Moreover, the color filter 21-1 is made to have the thickness that the thickness of the color filter 21-2 of the transmissive region Ar2 and the thickness of the interval adjustment layer 22 in the first embodiment are added. Therefore, a total of six color filters in all red (R), green (G), blue (B) pixels are necessary to be formed.

As the liquid crystal display in connection with the present embodiment, each color filter in each red (R), green (G), blue (B) pixel is different in the reflective region Ar1 and the transmissive region Ar2 is used. Therefore, it is not necessary to form the independent interval adjustment layer respectively, by changing the thickness of the color filter, the cell gap of the reflective region Ar1 and the transmissive region Ar2 can be adjusted. When the liquid crystal display in connection with the present embodiment is produced actually and the measurement of the contrast ratio is performed, the equivalent value to the first embodiment as the contrast ratio is 120 is obtained.

As well, in also the present embodiment, along with the second embodiment, in the exposing process of forming unevenness on the surface of the light-sensitive film 13 in the reflective region Ar1, by exposing in each red (R), green (G), blue (B) pixel, or changing the thickness of the color filter in each red (R), green (G), blue (B) pixel, it may be changed the cell gap in each red (R), green (G), blue (B) pixel. Moreover, as the third embodiment, the liquid crystal layer 30 may be Homogenious alignment. As this result, without complicating the manufacturing process, as mentioned above, the liquid crystal display having high contrast can be produced.

For example, the values and materials in the present embodiments are one of the examples and not limited these examples. Moreover, in the second to fourth embodiments, the example that the cell gap is optimized at each red (R), green (G), blue (B) pixel is explained, but the cell gap of at least two pixels may be optimized. For example, the cell gaps of the red and the green pixel are equalized, and the cell gap of only blue pixel may be changed.

Note that the present invention is not limited to said embodiments and includes modifications within the scope of claims.

What is claimed is:

1. A liquid crystal display having a plurality of liquid crystal cells each cell having a reflective region and a transmissive region, said liquid crystal display comprising:
   a first substrate with a reflective electrode in said reflective region and a transparent electrode in said transmissive region;
   a second substrate at a predetermined interval from said first substrate;
   a liquid crystal layer between said first substrate and said second substrate;
   a first color filter within said reflective region and between said liquid crystal layer and said second substrate having an upper portion closer to the second substrate which extends laterally across the entire reflective region to the transmissive region and a lower portion closer to the first substrate which is separated from the transmissive region by a distance;
   a second color filter within said transmissive region and between said liquid crystal layer and said second substrate; and
   a spacer within said reflective region and formed between said reflective electrode and said first color filter,
   wherein,
      said reflective electrode and said transparent electrode are formed on a substantially planer surface of the first substrate
      said first color filter is thicker than said second color filter,
      the distance between said first color filter and said reflective electrode is substantially half of the distance between said second color filter and said transparent electrode, and
      the distance between the second color filter and the transparent electrode is adjusted by the thickness of the first color filter and the thickness of the spacer formed thereon,
      said spacer contacts said planer surface of the first substrate.

2. A liquid crystal display as set forth in claim 1, wherein the spacer is a columnar spacer that is formed in said reflective region and an interval between said first substrate and said second substrate is determined by the thicknesses of said spacer and said first color filter.

3. A liquid crystal device as set forth in claim 1, wherein said distance between said second color filter and said transparent electrode is different for different color pixels, and the distances for red, green, and blue pixels are provided so that the distance for red pixels is the longest and the distance for blue pixels is the shortest.

4. A liquid crystal device as set forth in claim 1, wherein said liquid crystal layer has homogenous alignment that a long axis of a liquid crystal molecule turns to the same direction between said first substrate and said second substrate.

5. A method of producing a liquid crystal display having a plurality of liquid crystal cells each liquid crystal cell having a reflective region and a transmissive region, said method comprising:
   a step of forming a reflective electrode in said reflective region on a first substrate and forming a transparent electrode in said transmissive region on said first substrate;
   a step of forming within said reflective region on a second substrate a first color filter between said first substrate and said second substrate having an upper portion closer to the second substrate which extends laterally across the entire reflective region to the transmissive region and a lower portion closer to the first substrate which is separated from the transmissive region by a distance;
   a step of fixing said first substrate and said second substrate with a predetermined interval therebetween; and
   a step of inserting liquid crystal between said first and second substrates to form said liquid crystal layer;
   a step of forming within said transmissive region a second color filter between said liquid crystal layer and said second substrate; and
   a step of forming a spacer within said reflective region between said reflective electrode and said first color filter,
   wherein,
      said first color filter is thicker than said second color filter, said reflective electrode and said transparent electrode are formed on a substantially planer surface of the first substrate, the distance between said first color filter and said reflective electrode is substantially half of the distance between said second color filter and said transparent electrode, and the distance between the second color filter and the transparent electrode is adjusted by the thickness of the first color filter and the thickness of the spacer formed thereon.

6. A method of producing a liquid crystal display as set forth in claim 5, wherein said step of forming a reflective electrode in said reflective region on said first substrate and forming a transparent electrode in said transmissive region on said first substrate comprises:

a step of forming a transparent light-sensitive film and planarizing the surface of said substrate on said first substrate;

a step of processing said light-sensitive film by exposing the surface of said light-sensitive film in said reflective region so that said reflective electrode has a surface effective to diffuse or reflect incident light;

a step of forming said reflective electrode by coating said light-sensitive film in said reflective region; and a step of forming said transparent electrode in said transmissive region on said first substrate.

7. A method of producing a liquid crystal display as set forth in claim 5, wherein the spacer is a columnar spacer that is formed in said reflective region and an interval between said first substrate and said second substrate is determined by the thicknesses of said spacer and said first color filter.

8. A method of producing a liquid crystal display as set forth in claim 6, further comprising a step of processing said light-sensitive film so that the thickness of said liquid crystal layer differs across at least two color filters.

9. A method of producing a liquid crystal display as set forth in claim 8, further comprising a step of forming a liquid crystal layer having homogeneous alignment such that a long axis of a liquid crystal molecule turns to the same direction between said first substrate and said second substrate.

10. A method of producing a liquid crystal display as set forth in claim 5, wherein at least one of the first and the second color filters are formed such that a light of the same wavelength is transmitted with different materials separately in said reflective region and said transmissive region.

11. A method of producing a liquid crystal display as set forth in claim 10, wherein said at least one of said first and said second color filters are formed by forming a color filter layer extending across said transmissive and reflective regions.

12. A method of producing a liquid crystal display as set forth in claim 11, further comprising a step of forming a liquid crystal layer having a homogenous alignment such that a long axis of the liquid crystal molecule turns to the same direction between said first substrate and said second substrate.

* * * * *